United States Patent
Nishibata

(10) Patent No.: US 12,132,431 B2
(45) Date of Patent: Oct. 29, 2024

(54) CONTROL CIRCUIT OF POWER CONVERTER

(71) Applicant: DENSO CORPORATION, Kariya (JP)

(72) Inventor: Kouichi Nishibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 18/146,812

(22) Filed: Dec. 27, 2022

(65) Prior Publication Data

US 2023/0129767 A1 Apr. 27, 2023

Related U.S. Application Data

(63) Continuation of application No. PCT/JP2021/022063, filed on Jun. 10, 2021.

(30) Foreign Application Priority Data

Jun. 25, 2020 (JP) ................. 2020-109858

(51) Int. Cl.

| | | |
|---|---|---|
| H02K 17/32 | (2006.01) | |
| H02K 23/68 | (2006.01) | |
| H02K 27/30 | (2006.01) | |
| H02M 7/5387 | (2007.01) | |
| H02P 7/00 | (2016.01) | |
| H02P 27/06 | (2006.01) | |
| H02P 29/024 | (2016.01) | |

(52) U.S. Cl.
CPC .... *H02P 29/0241* (2016.02); *H02M 7/53871* (2013.01); *H02P 27/06* (2013.01)

(58) Field of Classification Search
CPC .. H02P 29/0241; H02P 27/06; H02M 7/53871

USPC ........................................................ 318/434
See application file for complete search history.

(56) References Cited

U.S. PATENT DOCUMENTS

| | | | |
|---|---|---|---|
| 8,499,885 B1 | 8/2013 | Satou et al. | |
| 9,755,569 B2 * | 9/2017 | Muramatsu | ......... H02P 29/0241 |
| 11,077,754 B2 * | 8/2021 | Fukui | ........................ H02P 5/74 |
| 11,689,144 B2 * | 6/2023 | Kim | ..................... H02P 29/024 |
| | | | 318/3 |
| 2009/0108674 A1 | 4/2009 | Ozaki et al. | |
| 2017/0305274 A1 | 10/2017 | Saha et al. | |

(Continued)

FOREIGN PATENT DOCUMENTS

| | | |
|---|---|---|
| JP | 2005-153780 A | 6/2005 |
| JP | 2018-98959 A | 6/2018 |
| JP | 2018-164380 A | 10/2018 |

*Primary Examiner* — Erick D Glass
(74) *Attorney, Agent, or Firm* — Oliff PLC

(57) ABSTRACT

A control circuit is applied to a system provided with a rotary electric machine, a power converter electrically connected to a winding of the rotary electric machine, a power source, a cutoff switch provided on an electrical path that connects the power source and the power converter, and a storage unit. The control circuit is provided with a failure determination unit that determines whether a failure occurs in the system and a regeneration prevention unit that prevents a power regeneration, where a current flows from a rotary electric machine side towards a storage unit side, from occurring. In the case where the failure determination unit determines that a failure occurs in the system, the cutoff switch is turned OFF after the regeneration prevention unit prevents an occurrence of the power regeneration.

9 Claims, 22 Drawing Sheets

(56) References Cited

U.S. PATENT DOCUMENTS

2019/0149063 A1 5/2019 Onda et al.
2019/0173412 A1 6/2019 Kawazu

* cited by examiner

CONTROL CIRCUIT OF POWER CONVERTER

CROSS-REFERENCE OF RELATED APPLICATIONS

This application is the U.S. bypass application of International Application No. PCT/JP2021/022063 filed on Jun. 10, 2021, which designated the U.S. and claims priority to Japanese Patent Application No. 2020-109858 filed on Jun. 25, 2020, the contents of both of these are incorporated herein by reference.

BACKGROUND

Technical Field

The present disclosure relates to a control circuit of a power converter applied to a system provided with a power converter electrically connected to windings of a rotary electric machine, a power source and a storage unit connected to an electrical path that connects the power source and the power converter.

Description of the Related Art

As a type of control circuit of a power converter, a shutdown control is executed in which upper-lower arm switches that constitute the power converter are forcibly turned off when determined that a failure has occurred in the system. When executing the shutdown control, if a reverse voltage is present on the windings due to a rotation of the rotor constituting the rotary electric machine, line voltage between windings may become higher than a voltage of a storage unit. The state where the line voltage becomes higher occurs, for example, when an amount of field magnetic flux of the rotor is high or the rotational speed of the rotor is high.

SUMMARY

The present disclosure discloses a control circuit for a power converter applied to a system provided with a rotary electric machine, a power converter electrically connected to a winding of the rotary electric machine, a power source, a cutoff switch provided on an electrical path that connects the power source and the power converter, and a storage unit connected to a portion opposite to the power source on the electrical path relative to the cutoff switch. The control circuit includes: a failure determination unit that determines whether a failure occurs in the system; and a regeneration prevention unit that prevents a power regeneration, where a current flows from a rotary electric machine side towards a storage unit side, from occurring. In the case where the failure determination unit determines that a failure occurs in the system, the cutoff switch is turned OFF after the regeneration prevention unit prevents an occurrence of the power regeneration.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DETAILED DESCRIPTION OF THE PREFERRED EMBODIMENTS

Figure 1:
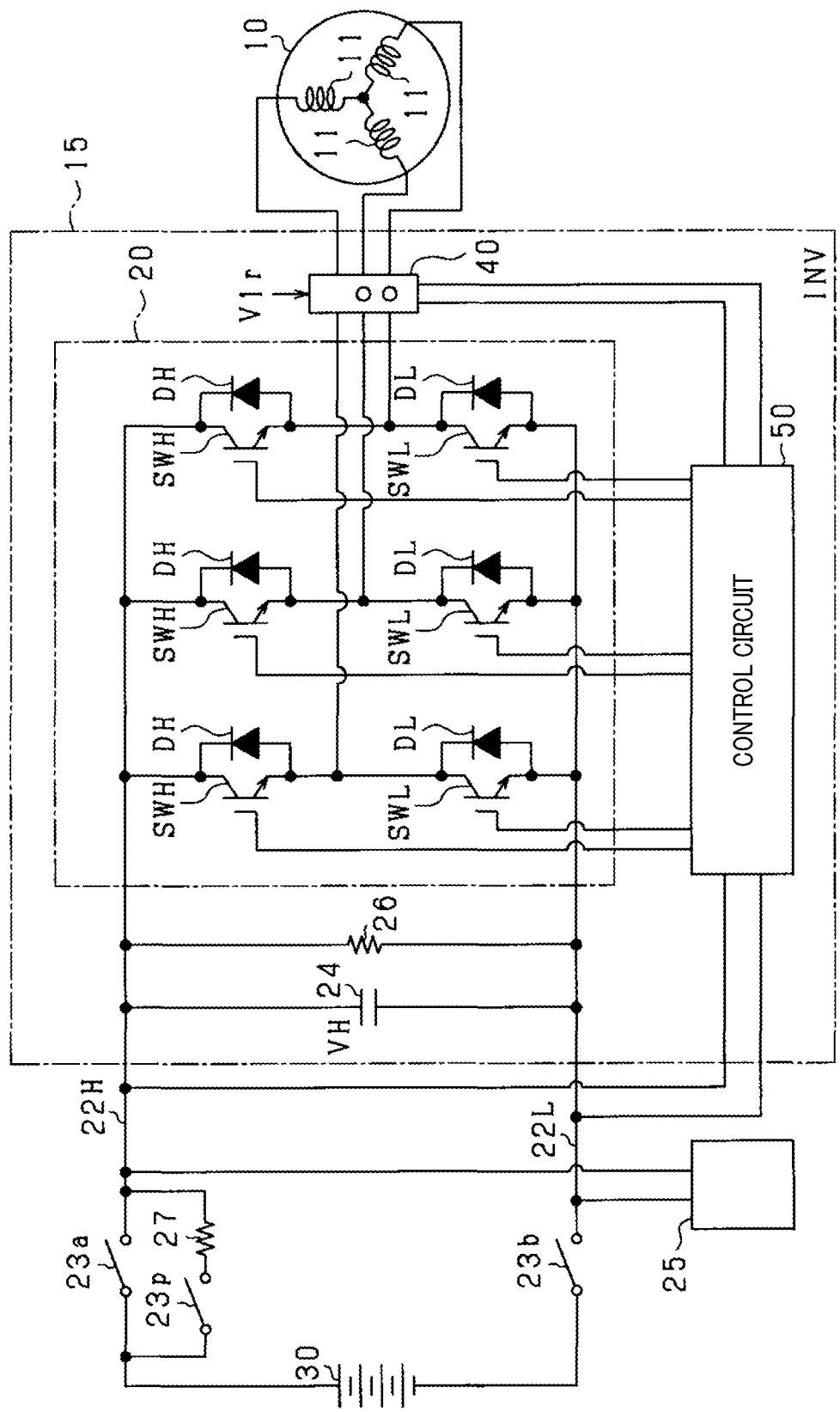
FIG. 1 is a diagram showing an overall configuration of a control system according to a first embodiment.

Patent literature JP-A-2018-164380 discloses a type of control circuit of a power converter. According to the control circuit disclosed by the above patent literature, a shutdown control is executed in which upper-lower arm switches that constitute the power converter are forcibly turned off when determined that a failure has occurred in the system. When executing the shutdown control, if a reverse voltage is present on the windings due to a rotation of the rotor constituting the rotary electric machine, line voltage between windings may become higher than a voltage of a storage unit. The state where the line voltage becomes higher occurs, for example, when an amount of field magnetic flux of the rotor is high or the rotational speed of the rotor is high.

In the case where the line voltage of the windings is higher than that of the storage unit, even when a shutdown control is being executed, power regeneration occurs as a phenomenon in which the current flows towards the storage unit from the rotary electric machine side. As a result, the DC voltage in the storage unit side of the power converter rapidly increases, which may cause a malfunction at at least either the storage unit or the power converter.

In order to solve the problem, the control circuit disclosed in the above patent literature executes a short-circuit control in which either one of upper or lower arm switch is turned ON and the other arm switch is turned OFF so as to avoid the power regeneration.

A system provided with a rotary electric machine and a power converter may also include one having a cutoff switch such as a relay provided on an electrical path that connects between a power source and a power converter. In this case, the storage unit is connected to an electrical path opposite to the power source with respect to the cutoff switch.

When determined that a failure has occurred in the system, in order to protect the system, a short circuit control is performed to avoid occurrence of power regeneration and the cutoff switch is turned OFF. When the cutoff switch is turned OFF before performing the short-circuit control, the storage unit is charged by the reverse voltage generated in the rotary electric machine, causing a problem in which the voltage of the storage unit rapidly increases. As a result, a problem arises in which a malfunction may occur at at least either the storage unit or the power converter. In this respect, in order to secure safety, the capacity of the storage unit may be increased. However, in this case, the manufacturing cost, the size and the weight of the storage unit may increase. Note that the configuration for avoiding occurrence of power regeneration is not limited to the configuration of the short circuit control.

With reference to the drawings, embodiments of the present disclosure will be described.

First Embodiment

Hereinafter, a first embodiment in which a control circuit according to the present disclosure is embodied will be described with reference to drawings. The control circuit of the present embodiment is adapted for a three-phase inverter. In the present embodiment, the control system provided with the inverter is mounted on a vehicle such as an electrical vehicle or a hybrid vehicle.

As shown in FIG. 1, the control system is provided with a rotary electric machine 10 and an inverter 15. The rotary electric machine 10 is an on-vehicle main machine in which the rotor thereof is capable of transmitting force from/to the driving wheel which is not shown. According to the present embodiment, as the rotary electric machine 10, a synchronous machine is used. More specifically, a permanent magnet synchronous machine is used.

The inverter 15 is provided with a switching device unit 20. The switching device unit 20 includes three series-connected bodies for three phases each including an upper arm switch SWH and a lower arm switch SWL. In each phase, a first end of a winding 11 of the rotary electric machine 10 is connected to a connection point between the upper and switch SWH and the lower arm switch SWL. Similarly, second ends of respective windings 11 are connected to each other at a neutral point. The respective windings 11 are arranged to be mutually shifted by 120° of electrical angle. According to the present embodiment, as the respective switches SWH and SWL, voltage controlled type semiconductor switching elements, specifically IGBTs are used. For the upper and lower arm switches, upper and lower arm diodes DH and DI are connected in reverse as free-wheel diodes.

A positive electrode terminal of a high voltage power source 30 is connected to a collector of each upper arm switch SWH as a high voltage side terminal via a high voltage side electrical path 22H. A negative electrode terminal of the high voltage power source 30 is connected to an emitter of each lower arm switch SWL as a low voltage side terminal via a low voltage side electrical path 22L. According to the present embodiment, the high voltage source 30 is a secondary battery of which the output voltage (rated voltage) is several hundreds of volts, for example.

A first cutoff switch 23a is provided at a high voltage side electrical path 22H, and a second cutoff switch 23b is provided at a low voltage side electrical path 22L. According to the present embodiment, each of the switches 23a and 23b is configured as a relay.

The control system is provided with a pre-charge switch 23p and a pre-charge resistor 27. According to the present embodiment, the pre-charge switch 23p is a relay. The pre-charge switch 23p and the pre-charge resistor 27 are connected in series. The series-connected body composed of the pre-charge switch 23p and the pre-charge resistor 27 is connected in parallel to the first cutoff switch 23a.

The inverter 15 is provided with a smoothing capacitor 24 as a storage unit. The smoothing capacitor 24 electrically connects between a portion on the high voltage side electrical path 22H closer to the switching device unit 20 than a position of the first cutoff switch 23a is, and a portion on the low voltage side electrical path 22L closer to the switching device unit 20 than a position of the second cutoff switch 23b is.

The control system is provided with an on-vehicle electrical equipment 25. The electrical equipment 25 includes, for example, at least one of an electrical compressor and a DC-DC converter. The electrical compressor configures in-vehicle air-conditioning apparatus. The electrical compressor is powered by the high voltage power source 30 and driven to circulate a coolant of on-vehicle refrigeration cycle. The DC-DC converter steps-down the output voltage of the high voltage source 30 and supplies the stepped-down voltage to the on-vehicle low voltage load. The low voltage load includes a low voltage power source 41 shown in FIG. 2. According to the present embodiment, the low voltage power source 31 is a secondary battery of which the output voltage (rated voltage) is lower than the output voltage (rated voltage) of the high voltage power source 30, for example 12 volts. The secondary battery is, for example, a lead-acid battery.

The inverter 15 is provided with a discharge resistor 26. The discharge resistor 26 electrically connects between a portion on the high voltage side electrical path 22H closer to the switching device unit 20 than a position of the first cutoff switch 23a is, and a portion on the low voltage side electrical path 22L closer to the switching device unit 20 than a position of the second cutoff switch 23b is.

Figure 2:
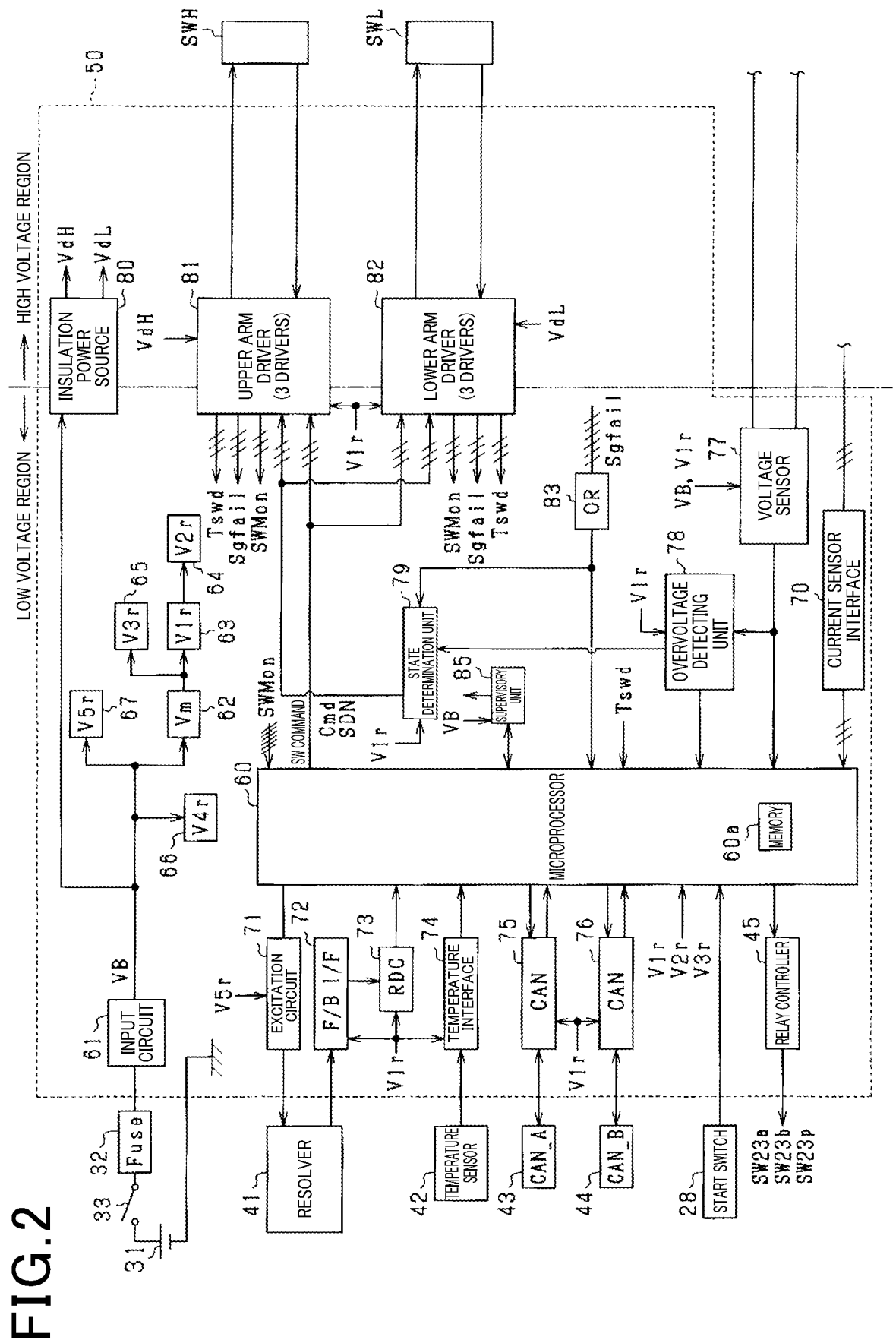
FIG. 2 is a diagram showing a control circuit and its peripheral configuration.

As shown in FIG. 2, the control system is provided with a starter switch 28. The starter switch 28 is, for example, an ignition switch or a press-type switch and is operated by a user of the vehicle.

As shown in FIGS. 1 and 2, the control system is provided with a phase current sensor 40, an angle sensor 41 and a temperature sensor 42. The phase current sensor 40 outputs current signal responding to current corresponding to two phases in the respective phase current flowing thought the rotary electric machine 10. The angle sensor 41 outputs an angle signal responding to an electrical angle of the rotary electric machine 10. The angle sensor 41 is, for example, a resolver, an encoder or a MR sensor having a magnetoresistance effect element. The angle sensor 41 is a resolver according to the present embodiment. The temperature sensor 42 outputs a temperature signal responding to the temperature of components that constitute the control system such as components of the rotary electric machine 10

With reference to FIG. 2, a configuration of the control circuit 50 will be described. The control circuit 50 is provided with an input circuit 61, an intermediate power source circuit 62 and first to fifth low voltage power source circuits 63 to 67. The positive electrode terminal of the low voltage power source 31 is connected to the input circuit 61 via the fuse 32 and the power source switch 33. A ground terminal as the ground potential is connected to the negative electrode terminal of the low voltage power source terminal 31.

A host ECU (not shown) as a host control apparatus of the control circuit 50 turns the power source switch 33 to be ON when determined that the starter switch 28 is turned ON. Thus, the power is started to be supplied to the control circuit 50 from the low voltage power source 31. On the other hand, when determined that the starter switch 28 is turned OFF, the host ECU turns the power source switch 33 to be OFF. Specifically, the host ECU turns the power source switch 33 to be OFF when determined that the starter switch 28 is turned OFF after performing a predetermined end sequence is completed. Thus, the power supply to the control circuit 50 from the low voltage power source 31 is stopped.

The intermediate power source circuit 62 steps down the output voltage VB of the input circuit 61, thereby generating an intermediate voltage Vm (e.g. 6V). The first low voltage power source circuit 63 steps down the output voltage Vm of the intermediate power source circuit 62, thereby generating the first voltage V1r (e.g. 5V). The second low voltage power source circuit 64 steps down the first voltage V1r outputted from the first low voltage power source circuit 63, thereby generating the second voltage V2r (e.g. 3.3V). The third low voltage power source circuit 65 steps down the first voltage V1r outputted from the first low voltage power source circuit 63, thereby generating the third voltage V3r. According to the present embodiment, the third voltage V3r is a voltage (e.g. 1.2V) lower than the second voltage V2r.

A fourth low voltage power source circuit 66 steps down the output voltage VB of the input circuit 61, thereby generating a fourth voltage V4r (e.g. 5V). According to the present embodiment, the fourth voltage V4r has the same value as that of the first voltage V1r. The fifth low voltage power source circuit 67 boosts the output voltage VB of the input circuit 61, thereby generating a fifth voltage V5r (e.g. 30V). The input circuit 61 and the respective power source circuits 62 to 67 are provided in a low voltage region of the control circuit 50.

The first voltage V1r of the first low voltage power source circuit 63 is supplied to a phase current sensor 40. Thus, the phase current sensor 40 is configured to output a current signal depending on the phase current. The current signal is transmitted to a microprocessor 60 via a current interface 70 included in the control circuit 50. The microprocessor 60 calculates an amount of phase current based on the transmitted current signal.

The control circuit 50 is provided with an excitation circuit 71, a FB interface 72 and a resolver digital converter 73. The excitation circuit 71 is configured to be capable of operating by being supplied with the fifth voltage V5r of the fifth low voltage power source circuit. The excitation circuit 71 supplies an excitation signal having sinusoidal wave to a resolver stator that constitutes the angle sensor 41. The angle signal outputted by the resolver stator is transmitted to the resolver digital converter 73 via the FB interface 72. The FB interface 72 and the resolver digital converter 73 are configured to be capable of operating by being supplied with the first voltage of the first low voltage power source circuit 63. The resolver digital converter 73 calculates an electrical angle of the rotary electric machine 10 based on the angle signal transmitted from the FB interface 82. The calculated electrical angle is transmitted to the microprocessor 60. The microprocessor 60 calculates an electrical angular velocity of the rotary electric machine 10 based on the transmitted electrical angle.

The control circuit 50 is provided with a temperature interface 74. The temperature signal outputted by the temperature sensor 42 is transmitted to the microprocessor 60 via the temperature interface 74. The temperature interface 74 is configured to be capable of operating by being supplied with the first voltage V1r of the first low voltage power source circuit 63. The microprocessor 60 calculates the temperature of the temperature sensor 42 based on the transmitted temperature signal.

The control circuit 50 is provided with a first and second CAN transceivers 75 and 76. The first and second CAN transceivers 75 and 76 is configured to be capable of operating by being supplied with the first voltage V1r of the first low voltage power source circuit 63. The microprocessor 60 exchanges information through the first and second CAN transceivers 75 and 76 and first and second CAN buses 43 and 44.

The current interface 70, the excitation circuit 71, the FB interface 72, the resolver digital converter 73, the temperature interface 74 and the first and second CAN transceiver 75 and 76 are provided in the low voltage region of the control circuit 50.

The microprocessor 60 is provided in the low voltage region and includes a CPU and peripheral circuits thereof. The peripheral circuit includes an input-output unit for transmitting and receiving signals with external devices, for example, and an AD converter. The first voltage V1r of the first low voltage power source circuit 63, the second voltage V2r of the second low voltage power source circuit 64 and the third voltage V3r of the third low voltage power source circuit 65 are supplied to the microprocessor 60.

The control circuit 50 is provided with a voltage sensor 77, an overvoltage detecting unit 78 and a state determination unit 79. The voltage sensor 77 is electrically connected to the high voltage side electrical path 22H and the low voltage side electrical path 22L and is configured to be capable of operating by being supplied with the output voltage VB of the input circuit 61 and the fifth voltage V5r of the fifth low voltage power source circuit 67. The voltage sensor 77 outputs a voltage signal depending on the terminal voltage of the smoothing capacitor 24. The voltage signal outputted from the voltage sensor 77 is transmitted to the microprocessor 60 and the over voltage detecting unit 78.

The over voltage detecting unit 78 is configured to be capable of operating by being supplied with the first voltage V1r of the first low voltage power source circuit 63. The over voltage detecting unit 78 determines whether the terminal voltage of the smoothing capacitor 24 calculated in accordance with the transmitted voltage signal exceeds an upper limit voltage thereof. The overvoltage detecting unit 78 outputs an over voltage signal to the microprocessor 60 and the state determination unit 79 when determined that the terminal voltage exceeds the upper limit voltage.

The state determination unit 79 is configured to be capable of operating by being supplied with the first voltage V1r of the first low voltage power source circuit 63. Also, according to the present embodiment, the state determination unit 79 is configured of a logic circuit. The voltage sensor 77, the over voltage detecting unit 78 and the state determination unit 79 are provided in the low voltage region of the control circuit 50.

The microprocessor 60 functions as a switching command generation unit that generates a switching command to be transmitted to the respective switches SWH and SWL of the switching device unit 20 so as to control a controlled variable of the rotary electric machine 10 to be the command value. The controlled variable is a torque, for example. The microprocessor 60 generates the switching command based on the output signal and the like of the respective sensors 40 to 42 and 77. Note that the microprocessor 60 generates the switching command to control the upper arm switch SWH and the lower arm switch SWL to be alternately ON in each phase.

The control circuit 50 is provided with an insulation power source 80, an upper arm driver 81 and a lower arm driver 82. According to the present embodiment, the upper arm driver 81 is provided for each upper arm switch SWH and the lower arm driver 82 is provided for each lower arm switch SWL. Hence, the total number of drivers 81 and 82 is 6.

The insulation power source 80 generates, in accordance with the voltage supplied from the input circuit 61, the upper arm drive voltage VdH to be supplied to the upper arm driver 81, and the lower arm drive voltage VdL to be supplied to the lower arm driver 82, and outputs them. The insulation power source 80 and the drivers 81 and 82 are provided in the low voltage region and the high voltage region across a boundary portion between the low voltage region and the high voltage region. Specifically, the insulation power source 80 is provided with an upper arm insulation power source provided for each of the three-phase upper arm drivers 81 and a lower arm insulation power source provided commonly for the three-phase lower arm drivers 82. According to the present embodiment, the upper arm insulation power source and the lower arm insulation power source are controlled by a common power source control unit. Note that the lower arm insulation power source may be provided separately for each of the three-phase lower arm drivers 82.

Figure 3:
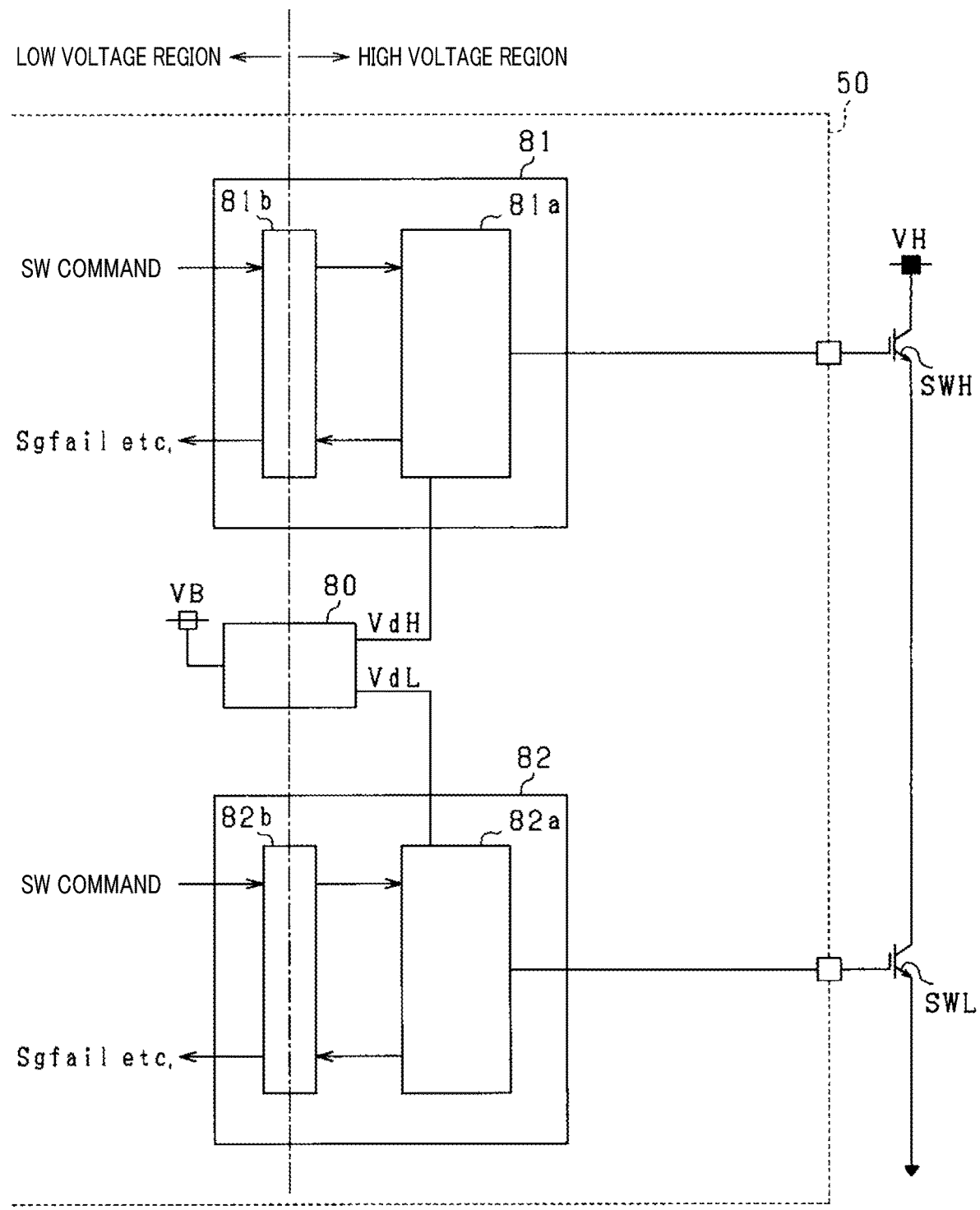
FIG. 3 is a diagram showing upper and lower arm drivers and their peripheral configuration.

Subsequently, with reference to FIG. 3, the upper and lower arm drivers 81 and 82 will be described.

The upper arm driver 81 is provided with an upper arm driving unit 81a as a switch driving unit and an upper arm insulation transmission unit 81b. The upper arm drive unit 81a is provided in the high voltage region. The upper arm insulation transmission unit 81b is provided in the low voltage region and the high voltage region across a boundary portion therebetween. The upper arm insulation transmission unit 81b transmits the switching command outputted from the microprocessor 60 to the upper arm drive unit 81a while electrically insulating between the low voltage region and the high voltage region. The upper arm insulation transmission unit 81b is a photo coupler or a magnetic coupler, for example.

In the upper arm drivers 81, the high voltage region side of the upper arm drive unit 81a and the upper arm insulation transmission unit 81b are configured to be capable of operating by being supplied with the upper arm drive voltage VdH of the insulation power source. In the upper arm driver 81, the low voltage region side of the upper arm insulation transmission unit 81b is configured to be capable of operating by being supplied with the first voltage V1r of the first low voltage power source circuit 63.

The upper arm drive unit 81a supplies a charge current to the gate of the upper arm switch SWH when the received switching command is an ON command. Thus, the gate voltage of the upper arm switch SWH becomes larger than the threshold voltage Vth and the upper arm switch SWH turns ON. On the other hand, the upper arm drive unit 81a causes a discharge current to flow from the gate to the emitter side of the upper arm switch SWH when the received switching command is an OFF command. Thus, the gate voltage of the upper arm switch SWH becomes smaller than the threshold voltage Vth and the upper arm switch SWH turns OFF.

The upper arm drive unit 81a transmits a failure signal Sgfail as information indicating an occurrence of failure in the upper arm switch SWH and temperature information Tswd of the upper arm switch SWH to the microprocessor 60 via the upper arm insulation transmission unit 81b. The failure of the upper arm switch SWH includes at least one of an over heat failure, an over voltage failure and an over current failure.

The upper arm driver 81 transmits the conclusive switching command SWMon in the low voltage region for the upper arm switch SWH to the microprocessor 60. The conclusive switching command is a logical calculated value between the switching command outputted from the microprocessor 60 to the upper arm insulation transmission unit 81b and a shutdown command CmdSDN outputted from the state determination unit 79 to the upper arm insulation transmission unit 81b. In the case where a switching command is outputted from the microprocessor 60 as an ON command, the conclusive switching command SWMon is the ON command. In the case where a switching command is outputted from the microprocessor 60 as an OFF command, the conclusive switching command SWMon is the OFF command.

The lower arm driver 82 is provided with a lower arm driving unit 82a as a switch driving unit and a lower arm insulation transmission unit 82b. According to the present embodiment, configurations of the respective drivers 81 and 82 are the same. Hence, detailed explanation of the lower arm driver 82 is appropriately omitted.

In the lower arm drivers 82, configurations of the lower arm driving unit 82a and the lower arm insulation transmission unit 82b in the high voltage region is capable of operating by being supplied with the lower arm drive voltage VdL. In the lower arm drivers, configuration of the lower arm insulation transmission unit 82b in the low voltage region is capable of operating by being supplied with the first voltage V1r of the first low voltage power source circuit 63.

The lower arm drive unit 82a supplies a charge current to the gate of the lower arm switch SWL when the received switching command is an ON command. Thus, the gate voltage of the lower arm switch SWL becomes larger than the threshold voltage Vth and the lower arm switch SWL turns ON. On the other hand, the lower arm drive unit 82a causes a discharge current to flow from the gate to the emitter side of the lower arm switch SWL when the received switching command is an OFF command. Thus, the gate voltage of the lower arm switch SWL becomes smaller than the threshold voltage Vth and the lower arm switch SWL turns OFF.

The lower arm drive unit 82a transmits a failure signal Sgfail as information indicating an occurrence of failure in the lower arm switch SWL and temperature information Tswd of the lower arm switch SWL to the microprocessor 60 via the lower arm insulation transmission unit 82b. The failure of the lower arm switch SWL includes at least one of an over heat failure, an over voltage failure and an over current failure.

Referring back to explanation of FIG. 2, the control circuit 50 is provided with a failure detection unit 83. The failure detection unit 83 is provided in the low voltage region, and configured to receive the failure signal Sgfail each of drivers 81 and 82. The failure detection unit 83 outputs, when receiving the failure signal Sgfail from any one of the drivers 81 and 82, an abnormality signal to the microprocessor 60 and the state determination unit 79. The abnormality signal received by the microprocessor 60 is stored into the memory 60a as a storage unit included in the microprocessor 60. The memory 60a is a non-transitory tangible recording media other than ROM (e.g nonvolatile memory other than ROM).

The lower arm driver 82 transmits the conclusive switching command SWMon in the low voltage region for the lower arm switch SWL to the microprocessor 60. The conclusive switching command is a logical calculated value between the switching command outputted from the microprocessor 60 to the lower arm insulation transmission unit 82b and a shutdown command CmdSDN outputted from the state determination unit 79 to the lower arm insulation transmission unit 82b.

A supervisory unit 85 is provided in the low voltage region and configured to be capable of operating by being supplied with the output voltage VB of the input circuit 61. The supervisory unit 85 supervises whether a failure has occurred in the microprocessor 60, and configured of a watchdog counter (WDC) or a function watchdog counter (F-WDC).

The control circuit 50 is provided with a relay controller 45. The relay controller 45 is provided in the low voltage region. The relay controller 45, when determined that a relay ON command (corresponds to switch ON command) is transmitted from the microprocessor 60, outputs an ON command to the first and second cutoff switches 23a and 23b and outputs an OFF command to a pre-charge switch 23p. Thus, the first and second cutoff switches 23a and 23b are controlled to be in ON state and the pre-charge switch 23p is controlled to be in OFF state. The relay controller 45 outputs an OFF command to the first and second cutoff switches 23a and 23b and the pre-charge switch 23p, when determined that the relay OFF command (corresponds to switch OFF command) is transmitted from the microprocessor 60. Thus, the first and second cutoff switches 23a and 23b and the pre-charge switch 23p are controlled to be in OFF state.

The relay controller 45 executes a pre-charge process of the smoothing capacitor 24 when determined that the pre-charge command is transmitted from the microprocessor 60. This process turns the pre-charge switch 23p and the second cutoff switch 23b to be in an ON state while maintaining the state of the first cutoff switch 23a to be in an OFF state. The pre-charge process prevents a rush current from flowing into the smoothing capacitor 24.

The state determination unit 79 determines whether an over voltage signal from the over voltage detecting unit 78 or an abnormality signal from the failure detection unit 83 is transmitted thereto. The state determination unit 79 outputs, when determined that the over voltage signal or the abnormality signal is received, the shutdown command CmdSDN to turns the upper and lower arm switches SWH and SWL for three phases to the upper and lower arm drivers 81 and 82 for three phases. Thus, the shutdown control is executed.

Figure 4:
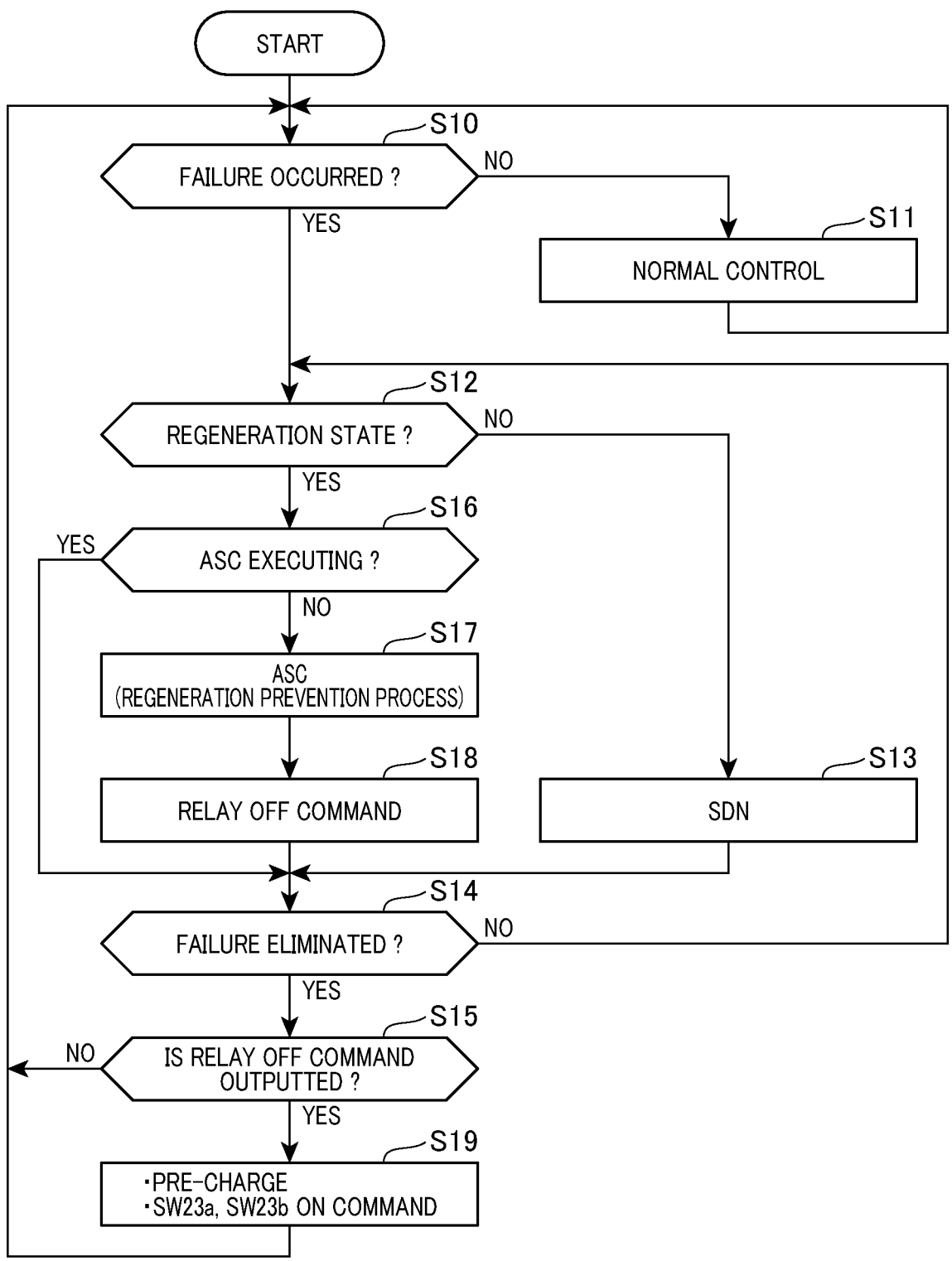
FIG. 4 is a flowchart showing a procedure of a three-phase short circuit control and a shutdown control executed by a microprocessor.

The microprocessor 60 executes a three-phase short circuit control. With reference to FIG. 4, the three-phase short circuit control process and the shutdown control process executed by the microprocessor 60 will be described. The three phase short-circuit control is also referred to as ASC (active short circuit) control.

At step S10, the process determines whether a failure has occurred in the control system. According to the present embodiment, the failure in the control system includes a failure of the upper and lower arm switches SWH and SWL. For example, the process may determine, based on the abnormality signal from the failure detection unit 83, whether a failure has occurred in any of respective upper arm switches SWH or lower arm switches SWL. In this case, the process may determine the phase and the arm where a failure has occurred in the respective upper and lower arm switches SWH and SWL, and may determine whether the failure is an open failure or a short failure.

Also, the failure in the control system may include a sensor failure or a communication failure. The sensor failure includes at least one of failures in the phase current sensor 40, the angle sensor 41, the temperature sensor 42 and the voltage sensor 77. The failure in the phase current sensor 40 includes at least one of a failure in the phase current sensor 40 and a failure in the current interface 70. The failure of the angle sensor 41 includes a failure in the angle sensor 41 itself, a failure in the excitation circuit 71, a failure in the FB interface 72 and a failure in the resolver digital converter 73. The failure in the temperature sensor 42 includes at least one of a failure in the temperature sensor 42 itself and a failure in the temperature interface 74.

The communication failure includes at least one of failures in the first CAN transceiver 75, the second CAN transceiver 76, the first CAN bus 43 and the second CAN bus 44.

Note that the process of step S10 corresponds to a failure determination unit.

When the process determines that none of failures has occurred at step S10, the process proceeds to step S11, outputs the relay ON command to the relay controller 45 and performs a normal control. According to the present embodiment, the normal control refers to a control for generating and outputting a switching command to control the controlled variable of the rotary electric machine 10 to be the command value in order to travel the vehicle. With the relay ON command, the first and second cutoff switches 23a and 23b are turned ON and the pre-charge switch 23p is turned OFF.

On the other hand, when determined that any one of failures has occurred at step S10, the process proceeds to step S12 and determines whether a power regeneration has occurred in which the current flows towards the smoothing capacitor 24 from the rotary electric machine 10 side.

Specifically, for example, the process may estimate a line voltage Vdemf when a reverse voltage is produced at the winging 22 and determine whether the estimated line voltage Vdemf exceeds the high voltage side power source voltage Vdc, and may determine that the power regeneration occurs when determined that the estimated line voltage Vdemf exceeds the high voltage side power source voltage Vdc. The high voltage side power source voltage Vdc is a terminal voltage of the smoothing capacitor 24 calculated based on the voltage signal of the voltage sensor 77. Further, the line voltage Vdemf may be estimated using an equation $Vdemf = K \times \omega e$ in accordance with an electrical angular velocity $\omega e$. Note that K is constant value determined by quantity of magnetic flux $\varphi$ of the magnetic pole of the rotor.

The line voltage Vdemf may be estimated based on the mechanical angular velocity of the rotor instead of the electrical angular velocity we, for example. Further, the line voltage Vdemf may be estimated by additionally using the detection value of the temperature sensor that detects rotor temperature of the rotary electric machine 10 or the estimated value of the temperature estimation unit that estimates the rotor temperature.

The value to be compared with the line voltage Vdemf is not limited to the high voltage side power source voltage Vdc but may be a predetermined determination value, for example. The determination value may be set to be a minimum value in a range of values which normal terminal voltage of the high voltage source 30 can take.

According to the present embodiment, the process at step S12 corresponds to a safety state determination unit.

When determined at step S12 that no power regeneration has occurred, the process determines that the shutdown control should be utilized as a control for setting the inverter 15 to be a safety state and proceeds to step S13. At step S13, the process outputs the OFF command as a switching command to the upper and lower arm switches SWH and SWL for three phases. Thus, the shutdown control is executed for preventing the power regeneration from occurring.

At step S14, the process determines whether a failure determined at step S10 is eliminated. When determined that the failure is not eliminated, the process proceeds to step S12. On the other hand, when determined that the failure is eliminated, the process proceeds to step S15 and determines whether a relay off command is outputted to the relay controller 45 with the process at step S18 (described later) during a period from when it is determined that a failure has occurred at step S10 to when it is determined that the failure is eliminated at step S14. When determined at step S15 that the relay OFF command is not outputted to the relay controller 45, the process proceeds to step S10.

In a period from when it is determined that a failure has occurred at step S10 to when it is determined that the failure is eliminated at step S14 (hereinafter failure existing period), when only a shutdown control between the three-phase short circuit control and the shutdown control is executed, the microprocessor 60 continuously outputs, during the failure existing period, a relay ON command (corresponds to switch ON command) to maintain the first and second cutoff switches 23a and 23b to be ON state.

When determined that a power regeneration has occurred at step S12, the process determines that a three-phase short circuit control is utilized for the control for setting the inverter 15 to be a safety state and proceeds to step S16. In step S16, the process determines whether the three-phase short circuit control is being executed.

When determined that the three-phase short circuit control is not being executed at step S16, the process proceeds to step S17. At step S17, the process outputs an OFF command as a switching command to one arm switch (hereinafter referred to as OFF side switch) in the three-phase upper and lower arm switches SWH and SWL and outputs an ON command as a switching command to the other arm switch (hereinafter referred to as ON side switch). Thus, the three-phase short circuit control is executed. When executing the process at step S17, the determination at step S16 in the next cycle is affirmative. Note that the switching command at step S17 corresponds to a regeneration preventing command.

For example, when a sensor failure or a communication failure occurs as a failure of the control system, an OFF command is outputted as a switching command to the three-phase upper arm switches SWH and an ON command is outputted as a switching command to the three-phase lower arm switches SWL.

Further, in the case where a failure of the upper and lower arm switches SWH and SWL as a failure of the control system occurs, the following processes may be executed depending on whether the failure is short failure or an open failure.

In the case where a short failure occurs on at least one of the upper and lower arm switches, the ON command is outputted as a switching command to the three-phase switches in one arm where the short failure occurred, and the OFF command is outputted as a switching command to the three-phase switches in the other arm.

On the other hand, when in the upper and lower arms, an open failure occurs on at least one switch in one arm, the ON command is outputted to the three-phase switches in an arm other than the arm where the open failure occurred and the OFF command is outputted to the three-phase switches in the other arm.

Next at step S18, the process outputs the relay OFF command to the relay controller 45 so as to turn the first and second cutoff switched 23a and 23b to be OFF. Thereafter, the process proceeds to step S14.

In the case where the process at step S18 is completed or it is determined, at step S16, that the three-phase short circuit control is being executed, the process proceeds to step S14. At step S14, when determined that the failure determined at step S10 cannot be eliminated, the process proceeds to step S12. On the other hand, when determined that the failure is eliminated, the process proceeds to step S15 and determines whether a relay off command is outputted to the relay controller 45 with the process at step S18 during a period from when it is determined that a failure has occurred at step S10 to when it is determined that the failure is eliminated at step S14.

When determined, at step S15, that the relay OFF command is outputted, the process proceeds to step S19. At step S19, the process outputs a pre-charge command to the relay controller 45. Thus, the pre-charge process is executed. Thereafter, the process outputs the relay ON command to the relay controller 45.

Note that the microprocessor 60 and the relay controller 45 correspond to an abnormality control unit.

Figure 5:
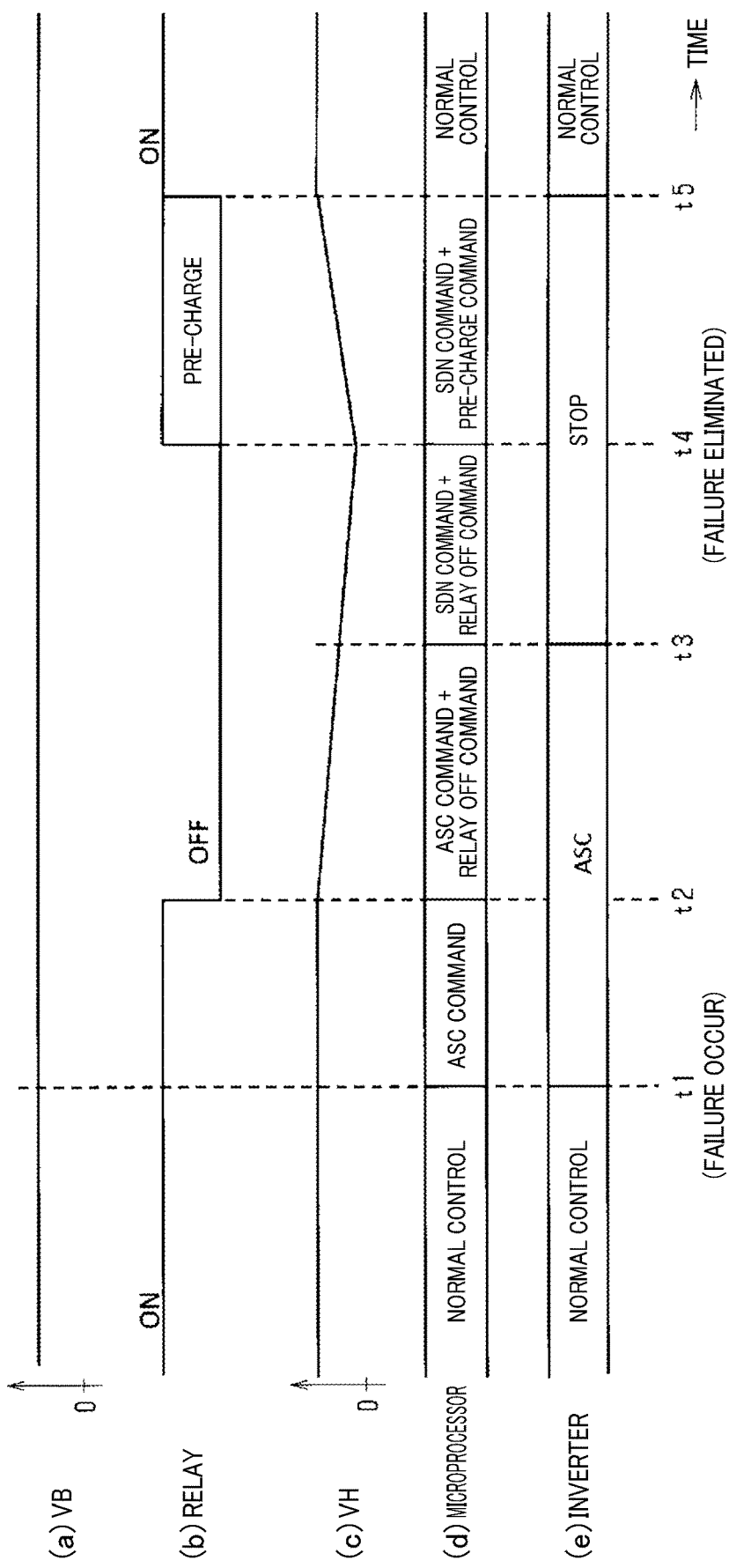
FIG. 5 is a timing diagram showing an example of a processing mode of the three-phase short circuit control and the shutdown control

With reference to FIG. 5, the three-phase short circuit control and the shutdown control will be described. In FIG. 5, the timing (a) shows a change in the output voltage VB of the input circuit 61, the timing (b) shows a change in the drive state of the first and second cutoff switches 23a and 23b, and the pre-charge switch 23p, the timing (c) shows a change in the terminal voltage VH of the smoothing capacitor 24. The timing (d) shows a change in the operational state of the microprocessor 60 and the timing (e) shows a change in the operational state of the inverter 15.

In a state where the normal control is performed, at time t1, the microprocessor 60 determines that a failure occurs on the control system. Since the microprocessor 60 determines that the three-phase short circuit control is utilized for a control for setting the inverter 15 to be the safe state, the microprocessor outputs the switching command for executing the three-phase short circuit control. Thus, the OFF command is outputted as the switching command to the OFF side switches in the three-phase upper and lower switches SWH and SWL, and the ON command is outputted as the switching command to the ON side switches. Thus, the three-phase short circuit control is executed. When it is determined that a failure has occurred on the control system at time t1, the OFF command is outputted to the three-phase upper and lower arm switches SWH and SWL to execute the shutdown control. Then, the three-phase short circuit control is executed. This control is for preventing a short circuit between the upper arm and the lower arm from occurring.

Thereafter, at time t2, since the microprocessor 60 outputs the relay OFF command to the relay controller 45, the first and second cutoff switched 23a and 23b are turned OFF. As a result, since a discharge current flows through the discharge resistor 26 from the smoothing capacitor 24, the terminal voltage of the smoothing capacitor 24 gradually decreases.

Thereafter, at time t3, the microprocessor 60 determines that the shutdown control is utilized as a control for setting the inverter 15 to be a safety state, and outputs the OFF command as a switching command to the three-phase upper and lower arm switched SWH and SWL. Thus, the upper and lower arm switches SWH and SWL are turned OFF.

Thereafter, at time t4, the microprocessor 60 determines that the failure of the control system is eliminated. Hence, the microprocessor 60 outputs the pre-charge command to the relay controller 45 and the pre-charge process is executed. Thereafter, at time t5, since the microprocessor 60 outputs the relay ON command to the relay controller 45, the first and second cutoff switches 23a and 23b are turned ON, and the pre-charge switch 23p is turned OFF. Then, the normal control is restarted.

Figure 6:
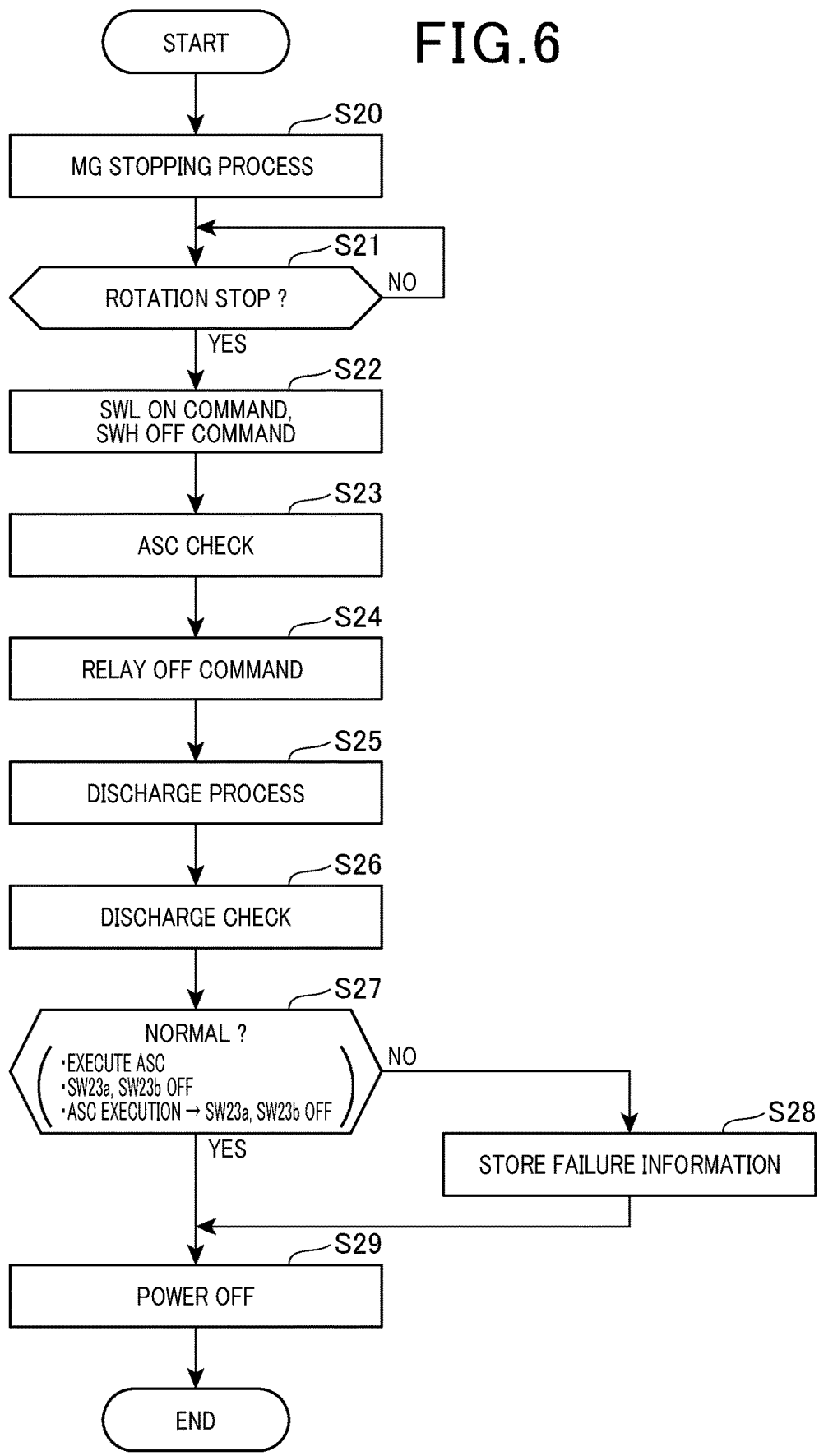
FIG. 6 is a flowchart showing a procedure of a checking process executed by the microprocessor.

According to the process shown in FIG. 4, the terminal voltage of the smoothing capacitor can be prevented from rapidly increasing when determined that the power regeneration has occurred. As a result, malfunction of the smoothing capacitor 24, the inverter 15 and the electrical equipment 25 can be prevented from occurring. In order to avoid such a malfunction, the three-phase short circuit control, and a process of changing the states of the first and second switches 23a and 23b to be OFF are required to be executed in this order. According to the present embodiment, a checking process is executed to check whether the above control and processes are able to be executed in that order. With reference to FIG. 6, the checking process will be described with reference to FIG. 6. This process is executed by the microprocessor 60.

At step S20, a stopping process of the rotary electric machine 10 is performed. The stopping process is executed when the control system is required to be stopped. According to the present embodiment, the stopping process outputs the OFF command as a switching command to the three-phase upper and lower arm switches SWH and SWL. According to the present embodiment, when the host ECU determines that the start switch 28 is controlled to be OFF, the host ECU commands the microprocessor 60 to execute the stopping process. The microprocessor 60, when determined that the stopping process is required to be executed, determines that stopping of the control system is commanded and executes a predetermined end sequence.

When the stopping process of the rotary electric machine 10 is completed, at step S21, the process waits until rotation of the rotor in the rotary electric machine 10 is stopped. Here, a determination whether the rotor rotation is stopped may be accomplished in accordance with an electrical angular velocity, for example.

When determined that the rotation of the rotor is stopped, the process proceeds to step S22 and executes a process for simulating a process executed when the failure is detected in the control system. In more detail, the OFF command is outputted as the switching command to the OFF side switches in the three-phase upper and lower switches SWH and SWL, and the ON command is outputted as the switching command to the ON side switches. According to the present embodiment, the upper and lower arm switches 81a and 82a to which the OFF command or the ON command is transmitted, correspond to regeneration prevention unit.

At step S23, the process checks whether the process at step S22 turns the ON side switches for three phases ON and the three-phase OFF side switches are OFF. Hereinafter, specific example of the checking method at step S23 will be described.

A first checking method will be described. The checking method is performed in accordance with the gate voltage of the switch and the voltage between the collector and the emitter. That is, in the case where both of a condition in which the gate voltage of the OFF side switch is less than or equal to an OFF determination voltage and a condition in which a voltage between the collector and the emitter of the OFF side switch is around the terminal voltage of the high voltage power source 30 are met, the OFF side switch is determined to be in OFF state. Note that the OFF determination voltage may be set to be less than the threshold voltage Vth, for example.

Further, in the case where both of a condition in which the gate voltage of the ON side switch is larger than or equal to the ON determination voltage and a condition in which the voltage between the collector and the emitter of the ON side switch is around 0V are met, the ON side switch is determined to be in ON state. Note that the ON determination voltage may be set to be the same value as the threshold voltage Vth or a value larger than the threshold Vth and lower than the output voltage of the insulation power source 80. For example, the ON determination voltage is set to be a value larger than the threshold voltage Vth and lower than the lower arm drive voltage VdL.

Subsequently, the second checking method will be described. The second checking method is performed in accordance with the conclusive switching command SWMon and an abnormality signal outputted from the failure detection unit 83. Specifically, in the case where both of a condition in which the conclusive switching command SWMon to the OFF side switches is set to be the OFF command and a condition in which an abnormality signal is not stored in the memory 60a are met, the OFF side switches are determined to be in OFF state.

Similarly, in the case where both of a condition in which the conclusive switching command SWMon to the ON side switches is set to be the ON command and a condition in which an abnormality signal is not stored in the memory 60a are met, the ON side switches are determined to be in ON state.

According to the second checking process, the process is able to determine, using a result of the normal control in which the torque of the rotary electric machine 10 is controlled to be the command value, whether the ON side switches and the OFF side switches are in an intended drive state.

When determined at step S23 that the three-phase OFF side switches are in OFF state when the ON side switches for three-phase are turned ON, the process determines that the three-phase short circuit control can be executed correctly.

Next at step S24, the process executes a process for simulating a process executed when the failure is detected in the control system. In more detail, the process outputs the relay OFF command to the relay controller 45.

Next at step S25, the process executes a discharging process of the smoothing capacitor 24. According to the present embodiment, this process allows the discharge current of the smoothing capacitor to flow through the discharge resistor 26.

Subsequently, at step S26, the process determines whether the first and second cutoff switches 23*a* and 23*b* are turned in the OFF state by the process of step S25. Specifically, for example, when determined that the high voltage side power source voltage Vdc calculated based on the voltage signal of the voltage sensor 77 is decreased to be lower than the high voltage side power source voltage Vdc before executing the process of step S25, or determined that the high voltage side power source voltage Vdc calculated based on the voltage signal of the voltage sensor 77 is lower than or equal to the predetermined value around 0V, the process may determine that the first and second switches 23*a* and 23*b* are in OFF state. In the case where the first and second cutoff switches 23*a* and 23*v* are maintained at OFF state, the terminal voltage of the smoothing capacitor 24 gradually decreases towards 0V by the discharging process. On the other hand, if the first and second cutoff switches 23*a* and 23*b* stays at ON state, even when the discharging process is executed, the high voltage power source supplies the charge to the smoothing capacitor.

The process at step S26 using the high voltage side power source voltage Vdc is able to accurately determine that the first and second cutoff switches 23*a* and 23*b* can be switched to OFF state.

Alternatively, at step S25, at least one of a process in which the switching device unit 20 allows the current to flow through the winding 11 and a process for driving the electrical equipment 25 may be executed, thereby prompting the discharging of the smoothing capacitor.

At step S27, the process determines whether the first to third conditions are all met. The first condition is satisfied when the three-phase short circuit control was determined to be able to correctly execute at step S23. The second condition is satisfied when the first and second cutoff switches 23*a* and 23*b* were determined to be able to be switched to OFF state at step S26. The third condition is that it is determined the first and second cutoff switches 23*a* and 23*b* are turned OFF after executing the three-phase short circuit control. Note that a determination whether the third condition is met may be made in accordance with the determination results of steps S23 and S26, for example.

When determined at step S27 that at least one of the first to third conditions is not met, at least one of failures is considered to occur among a failure in which the three-phase short circuit cannot be correctly executed, a failure in which the first and second cutoff switches 23*a* and 23*b* cannot be turned OFF, and a failure in which a process of the three-phase short circuit control and a process of turning the first and second cutoff switches 23*a* and 23*b* to be OFF state cannot be executed in this order. In this case, the process stores the information indicating occurrence of failure into the memory 60*a*. Thereafter, the process proceeds to step S29. Note that a process of notifying information indicating an occurrence of failure to the user may be performed at step S28. According to the present embodiment, processes of step S22 and S24 correspond to processing unit, the processes of steps S23, S26 and S27 correspond to checking unit and a process of step S25 corresponds to discharge processing unit.

When determined that the first to third conditions are all met at step S27, the process determines that the three-phase short circuit control and a process of turning the first and second cutoff switches 23*a* and 23*b* to be OFF state can be correctly executed in this order. Then, the process proceeds to step S29.

At step S29, as a process when completing the predetermined end sequence including steps S20, S21 and S25, a process for stopping the power supply to the control circuit 50 from the low voltage power source 31 is executed. This process is executed when the host ECU turns the power source switch 33 to be OFF.

Figure 7:
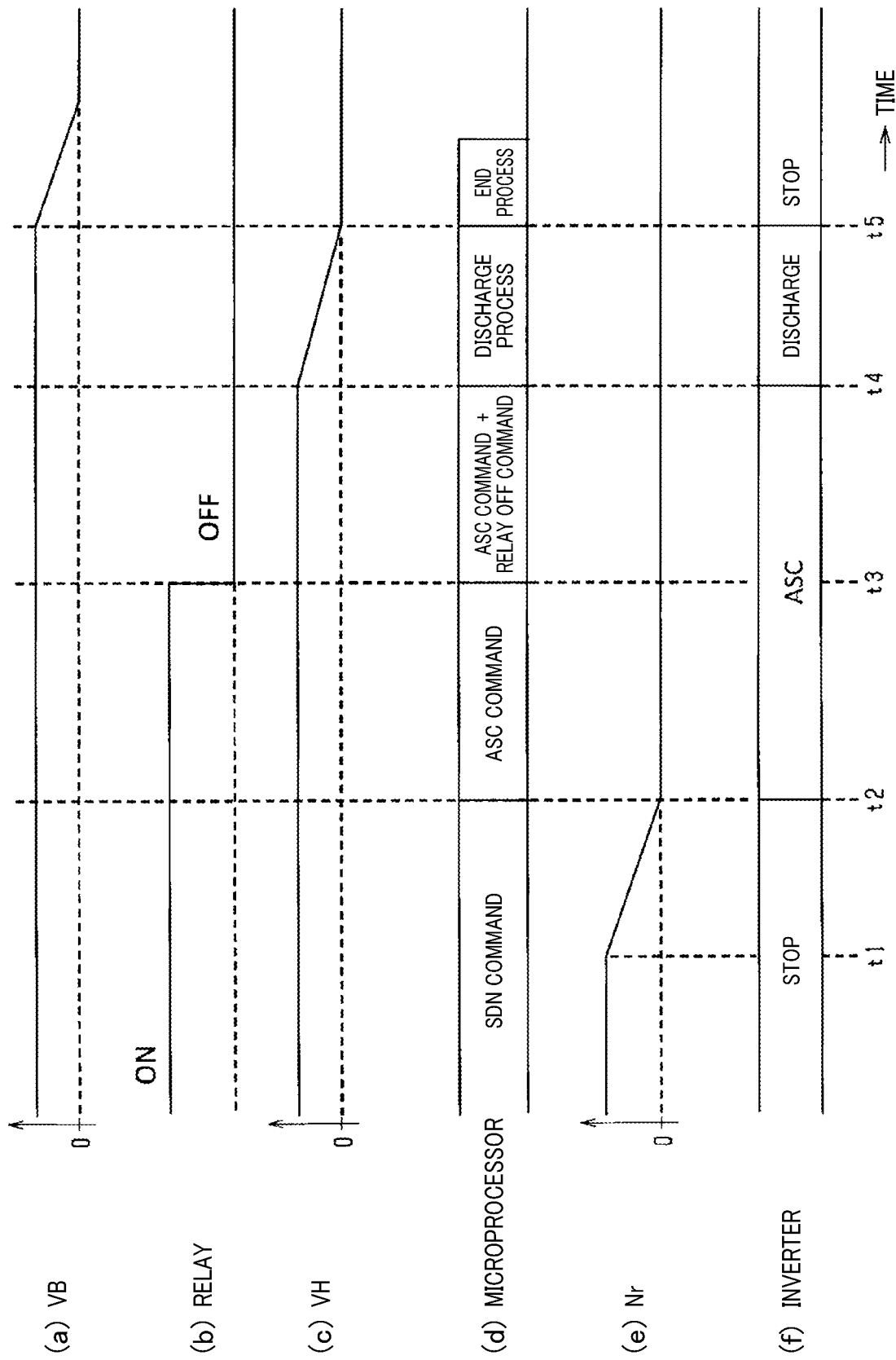
FIG. 7 is a timing diagram showing an example of a mode of checking process in an end sequence.

With reference to FIG. 7, an example of one mode of the end sequence will be described. In FIG. 7, a timing (e) shows a trend of the rotational speed Nr of the rotor in the rotary electric machine 10. The timings (a) to (d) and (f) correspond to the timings (a) to (e) in FIG. 5.

The control system is commanded to be stopped, whereby the stopping process of the control system is executed. Thus, at the time t1m the rotational speed Nr of the rotor starts to decrease. Thereafter, it is determined that the rotor rotation is stopped at time t2, an OFF command is outputted from the microprocessor 60 as the switching command to the OFF side switches among the three-phase upper and lower arm switches SWH and SWL, and an ON command is outputted from the microprocessor 60 as the switching command to the ON side switch. Thereafter, the process at step S23 is executed.

Thereafter, at time t3, a relay OFF command is outputted from the microprocessor 60 to the relay controller 45. Thereafter, at time t4, the discharge process of the smoothing capacitor 24 is executed, and the terminal voltage VH of the smoothing capacitor 24 starts to decrease to 0V.

Thereafter, at time t5, the process at step S27 is determined as normal, and the process at step S29 is executed. Thus, the output voltage VB of the input circuit 61 starts to decrease to 0V.

According to the above-described present embodiment, the following effects and advantages are obtained.

The microprocessor 60, when determined that a failure has occurred in the control system, outputs an ON command to the three-phase ON side switches, an OFF command to the three-phase OFF side switches and the relay OFF command to the relay controller 45, so as to turn the first and second cutoff switches 23*a* and 23*b* to be in OFF state after the three-phase ON side switches turn ON and the three-phase OFF side switches turn OFF. Thus, the terminal voltage of the smoothing capacitor 24 can be accurately prevented from rapidly increasing, whereby the smoothing capacitor 24 and the electrical equipment 25 can be protected.

In a state where a failure has occurred, when determined that a power regeneration occurs, the microprocessor outputs the ON command to the ON side switches, the OFF command to the OFF side switches and the relay OFF command to the relay controller 45. On the other hand, in a state where a failure has occurred, when determined that a power regeneration does not occur, the microprocessor continues to output the relay ON command to the relay controller 45 and maintains the first and second cutoff switches 23*a* and 23*b* to be ON state. Thereafter, when determined that the failure of the control system is solved, outputs of the pre-charge command and the relay ON command is unnecessary. As a result, a recovery time to resume the normal control from when the failure of the control system is solved can be shortened.

The microprocessor 60 executes processes at steps S22 and S24 for simulating a process executed when the failure is detected in the control system, and determines at step S27 whether the three-phase short circuit control and the process for turning the first and second cutoff switches 23a and 23b to be OFF state can be correctly executed in this order. Thus, these processes ensure proper execution of the three-phase short circuit control and the process for turning the first and second cutoff switches 23a and 23b to be OFF state in this order.

After outputting the relay OFF command to the relay controller 45, the process executes the discharging process of the smoothing capacitor 24 included in the end sequence. Then, the microprocessor 60 determines whether the first and second cutoff switches 23a and 23b can be turned OFF in accordance with a decrease in the high voltage side power source voltage Vdc by executing the discharging process. According to the configuration using the discharging process of the end sequence, the end sequence can be promptly completed.

Modification of First Embodiment

A DC current sensor that detects DC current flowing through the high voltage side electrical path 22H and the low voltage side electrical path 22L may be provided in the control system. In this case, when determined at step S12 shown in FIG. 4 that the DC current flows when executing the shutdown control based on the detection value of the DC current sensor, the process may determine that the power regeneration has occurred.

In the case where a sensor for detecting the line voltage is provided in the control system, the line voltage compared with the high voltage side power source voltage Vdc at step S12 shown in FIG. 4 may not be an estimation value but a detection value of the line voltage.

At step S19 shown in FIG. 4, in the case where the high voltage side power source voltage Vdc is higher than the threshold, the pre-charge command may not be outputted.

In the process at FIG. 4, processes of steps S12 and S13 may be unnecessary. In this case, when the determination at step S10 is affirmative, the process may proceed to step S16.

For example, in the case where an execution period of the three-phase short circuit control is restricted due to a thermal restriction of the winding 11, the switching device unit 20 and the like, when the process at step S12 shown in FIG. 4 is affirmative, with the driving control of the rotary electric machine 10, a process for lowering the rotational speed of the rotor may be executed. Thus, the control may be promptly switched to the shutdown control.

The respective cutoff switches 23a and 23b may have a function for monitoring the drive states of themselves and may transmit the monitored drive states to the microprocessor 60. In this case, instead of the processes of steps S25 and S26 shown in FIG. 6, the microprocessor 60 may execute, when determining that the monitored drive state is OFF state, a process for determining that the respective cutoff switches 23a and 23b are in OFF state.

The process at step S27 shown in FIG. 6 may be replaced by a process for determining whether first to fifth conditions are all met. The fourth condition may be, for example, a condition in which a period of shift between a first period and a first prescribed period is within a predetermined range. The first period is from when the process at step S22 start to when determined that the three-phase short circuit control is executed correctly.

The process for determining whether the three-phase short circuit control and the process for turning the first and second cutoff switches 23a and 23b to be OFF state can be correctly executed in this order may not be included in the end sequence.

Second Embodiment

Figure 8:
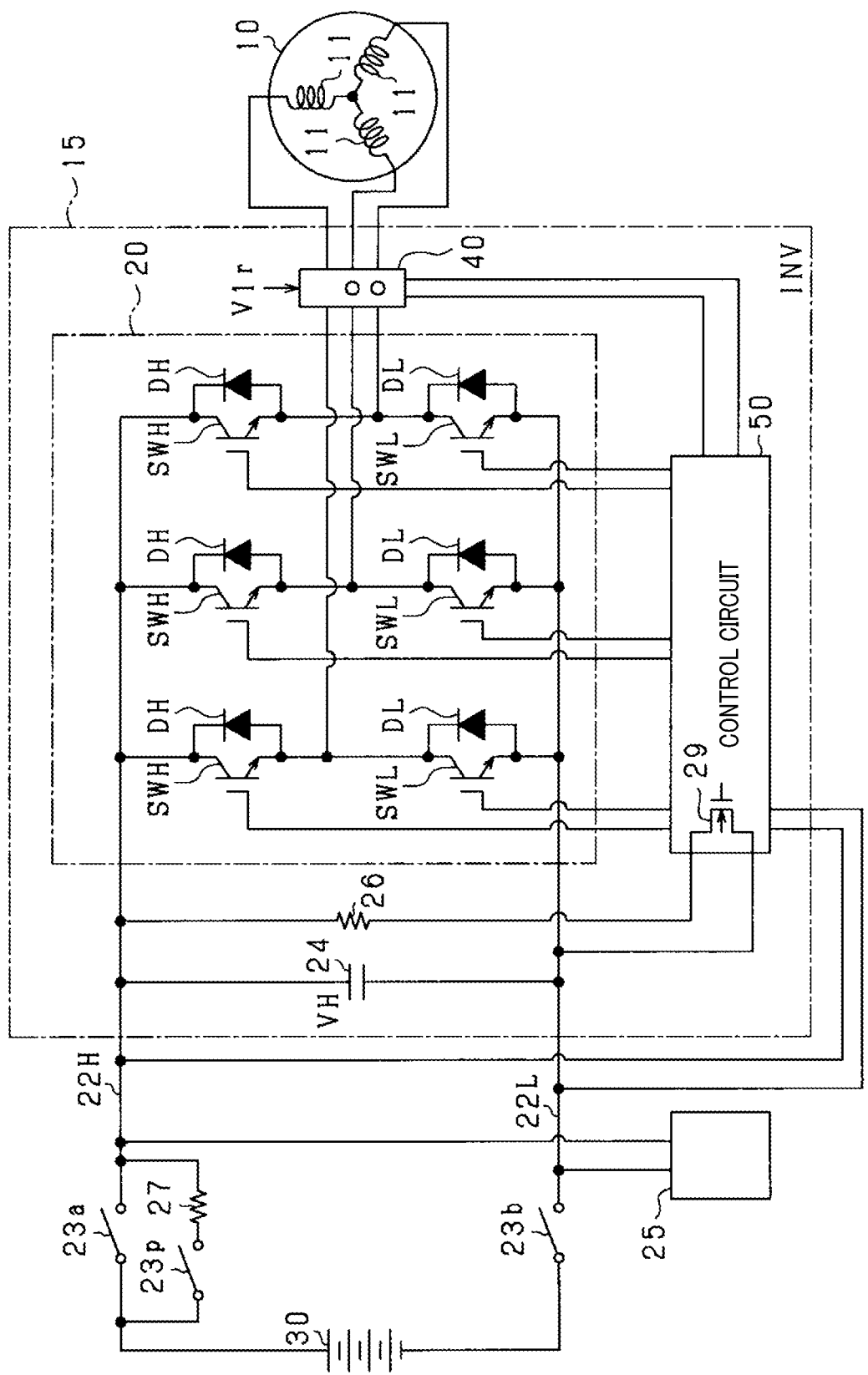
FIG. 8 is a diagram showing an overall configuration of a control system according to a second embodiment.
Figure 9:
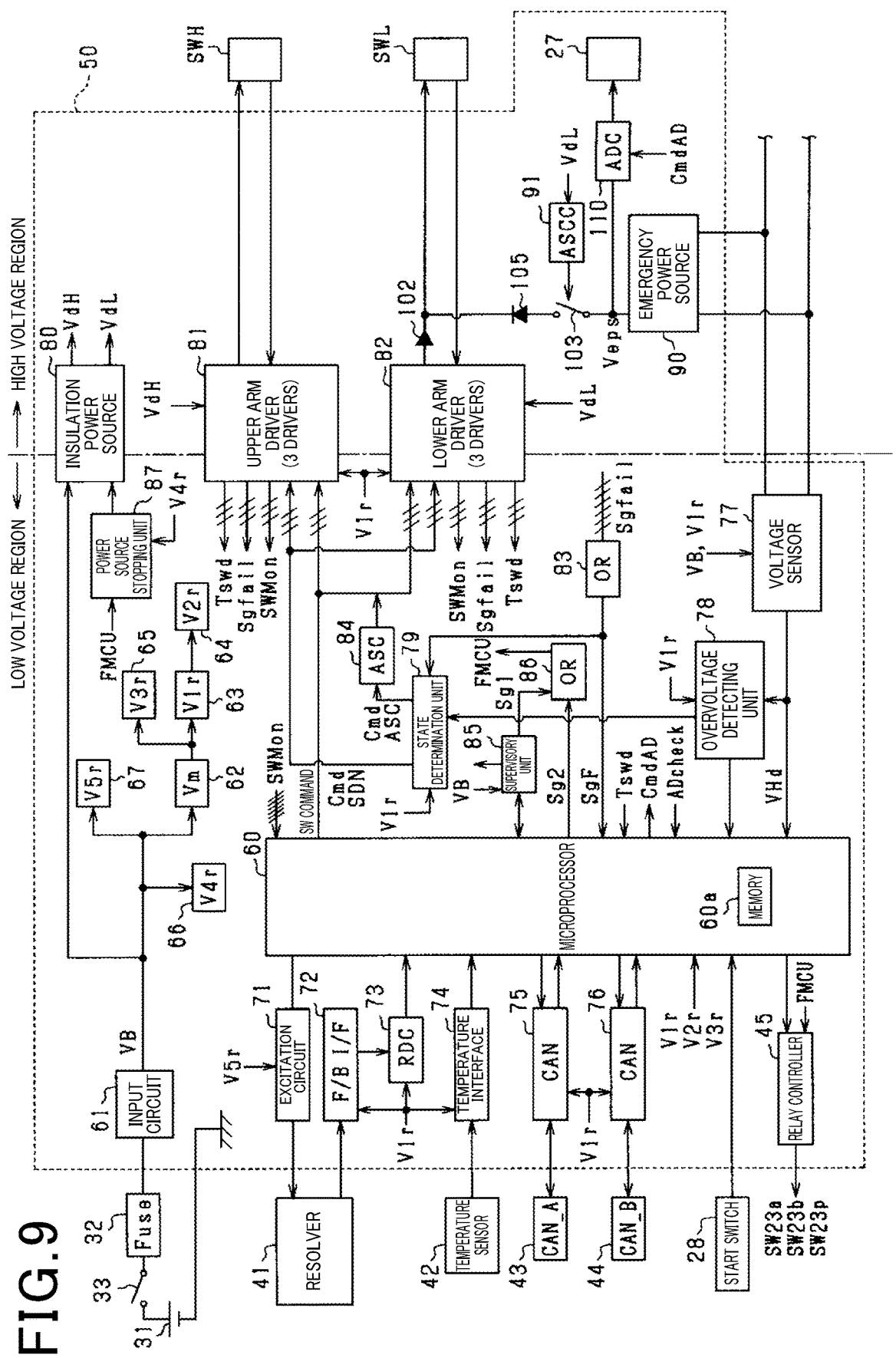
FIG. 9 is a diagram showing the control circuit and its peripheral configuration.

Hereinafter, for the second embodiment, with reference to the drawings, a configuration different from that in the first embodiment will be mainly described. According to the present embodiment, as shown in FIGS. 8 and 9, a part of the configuration of the control system is modified. Note that the same reference symbols are applied to configurations same as those shown in FIGS. 1 to 3 for the sake of convenience.

The inverter 15 is provided with a discharge switch 29. The discharge switch 29 is connected in series to the discharge resistor 26. The series-connected body composed of the discharge switch 29 and the discharge resistor 26 connects between a portion on the high voltage side electrical path 22H closer to the switching device unit 20 than a position of the first cutoff switch 23a is, and a portion on the low voltage side electrical path 22L closer to the switching device unit 20 than a position of the second cutoff switch 23b is. According to the present embodiment, the discharge switch 29 is a N-channel MOSFET and included in the control circuit 50.

As shown in FIG. 9, the control circuit 50 is provided with a low voltage side ASC command unit 84, an OR circuit 86 and a power source stopping unit 87. The low voltage ASC command unit 84, the OR circuit 86 and the power source stopping unit 87 are disposed in the low voltage region. The power source stopping unit 87 is configured to be capable of operating by being supplied with the fourth voltage V4r of the fourth low voltage power source circuit 66.

In the case where the low voltage side ASC command CmdASC is transmitted to the low voltage ASC command unit 84 from the state determination unit 79, the low voltage ASC command unit 84 forcibly changes the switching command to be transmitted to the three-phase lower arm drivers 82 to be ON command regardless of the switching command outputted from the microprocessor 60.

Figure 10:
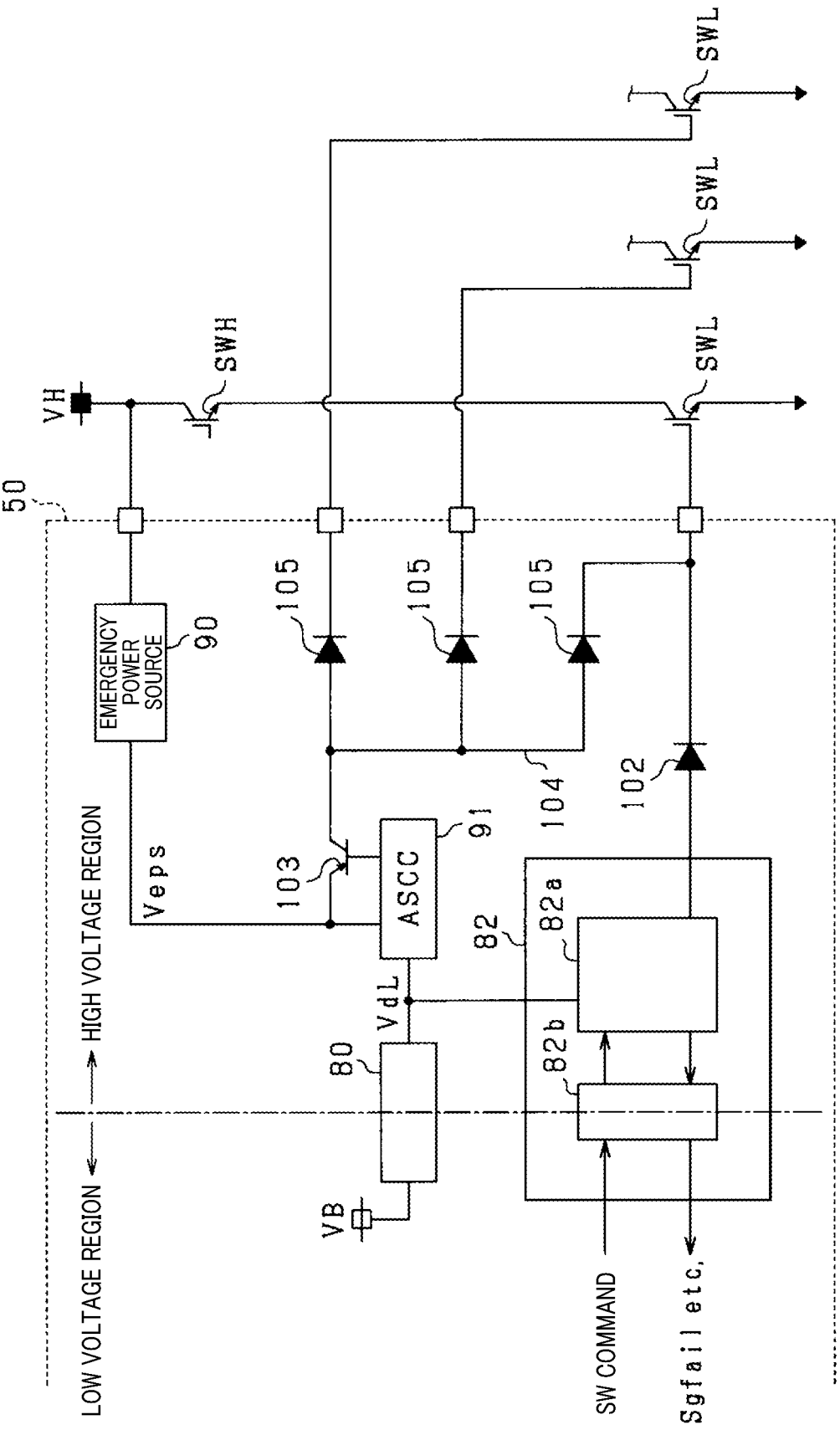
FIG. 10 is a diagram showing upper and lower arm drivers and their peripheral configuration.

With reference to FIGS. 9 and 10, a configuration of the high voltage region in the control circuit 50 will be described.

The control circuit 50 is provided with an emergency power source 90 and a high voltage ASC command unit 91. The high voltage ASC command unit 91 is configured to be supplied with the lower arm drive voltage VdL of the insulation power source 80.

The emergency power source 90 is supplied with the output voltage VH of the smoothing capacitor 24, thereby generating the emergency drive voltage Veps. According to the present embodiment, as the emergency power source 90, various power sources may be used such as a switching power source. A high voltage side of the smoothing capacitor 24 is connected to the input side of the emergency power source 90. The control unit of the emergency power source 90 controls the emergency drive voltage Veps outputted from the output side of the emergency power source 90 to be its target voltage.

According to the present embodiment, the control unit of the emergency power source 90 activates the emergency power source 90 at a timing at which an input voltage of the smoothing capacitor 24 reaches a predetermined voltage Vα in a period prior to a timing at which the input voltage reaches the output voltage of the smoothing capacitor 24 after the input voltage starts to increase when the power is supplied to the smoothing capacitor 24. According to the present embodiment, the activation of the emergency power source 90 refers to a start of controlling the emergency drive voltage Veps to be the target voltage with the control unit of the emergency power source 90. Starting the control, the emergency drive voltage Veps starts to increase to the target voltage. The emergency power source 90 is activated at a timing at which the input voltage reaches the predetermined voltage Vα, thereby setting the emergency drive voltage Veps of the emergency power source 90 to be in a controllable state earlier. According to the present embodiment, the predetermined voltage Vα is set to be an activation voltage of the control unit.

In the high voltage region of the control circuit 50, a first regulation diode 102 is provided in a gate charging path that connects the lower arm drive unit 82a and the gate of the lower arm switch SWL. The first regulation diode 102 is provided in a state where the anode is connected to the lower arm drive unit 82a. Note that illustration of a gate discharging path of the lower arm switch SWL is vomited.

The control circuit 50 is provided with an emergency switch 103. The emergency switch 103 connects the output side of the emergency power source 90 and a common path 104. The gate of the respective lower switch SWL is connected to the common path 104 via the respective second regulation diodes 105. The second regulation diode 105 is provided in a state where the anode thereof is connected to the common path 104. The second regulation diode 105 prevents the charge current outputted from the lower arm drive unit 82a to the gate of the lower arm switch SWL from flowing to the common path 104. Note that a plurality of second regulation diodes 105 may be connected in parallel to form a parallel-connected body and connected to the gates of the respective lower arm switches SWL.

Figure 11:
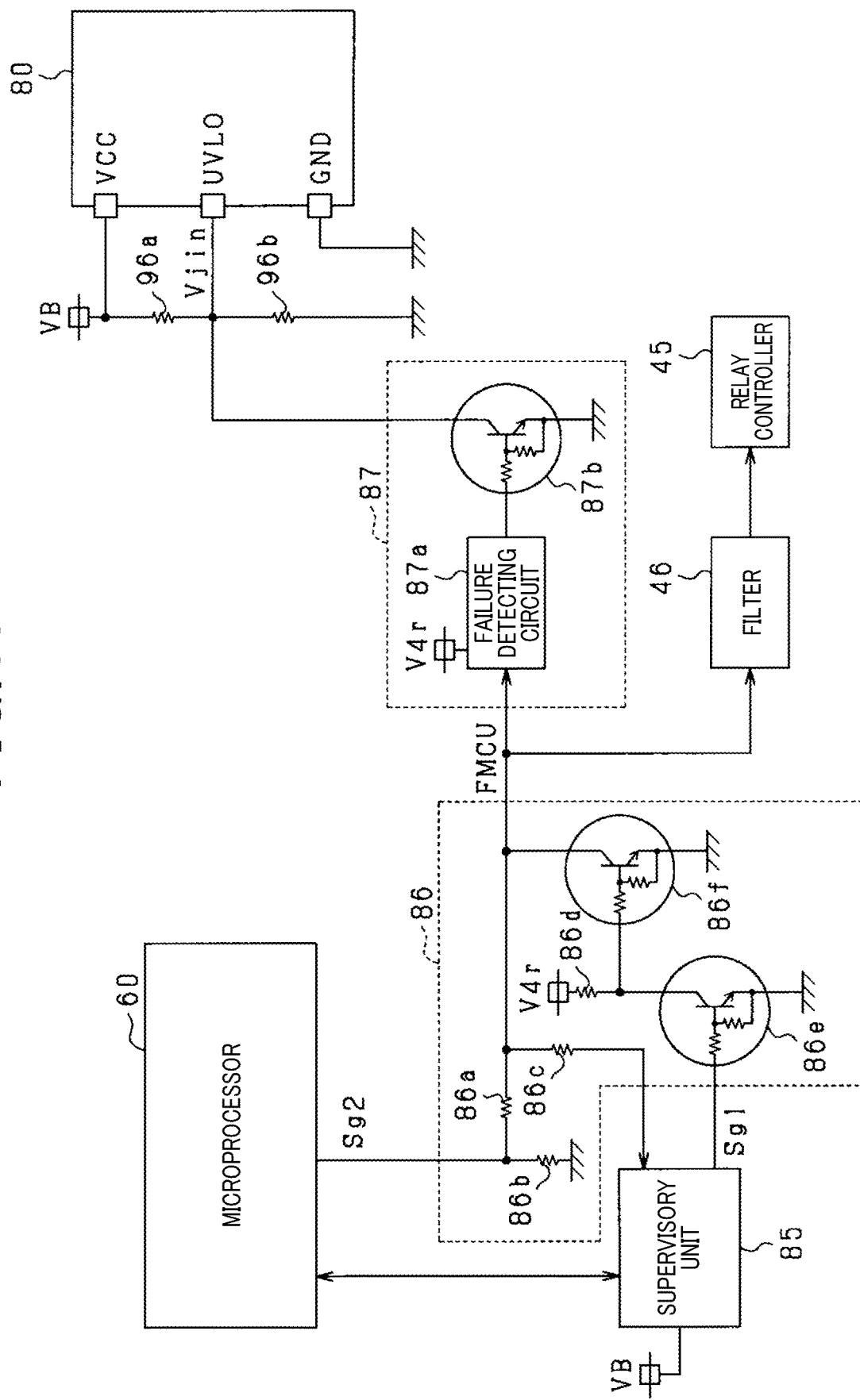
FIG. 11 is a diagram showing an OR circuit, a power source stopping unit and their peripheral configuration.

Subsequently, with reference to FIG. 11, the OR circuit 86, the power source stopping unit 87 and the peripheral circuit thereof will be described. The OR circuit 86 is provided with the first to fourth resistors 86a to 86d and the first and second switches 86e and 86f. The microprocessor 60 and the first end of the second resistor 86b are connected to the first end of the first resistor 86a. The second end of the second resistor 86b is connected to the ground. The second end of the first resistor 86a is connected to a supervisory unit 85 via the third resistor 86c.

The first end of the fourth resistor 86d is connected to the fourth low voltage power source 66 and the second end of the fourth resistor 86d is connected to the ground via the first switch 86a. A first determination signal Sg1 of the supervisory unit 85 is supplied to the base of the first switch 86e. The second end of the first resistor 86a is connected to the ground via the second switch 86f. The base of the second switch 86f is connected to a connection point between the fourth resistor 86d and the first switch 86e.

The microprocessor 60 has a self-supervising function. The microprocessor 60 sets the logical state of the second determination signal Sg2 to be H when determined that no failure is detected in itself. In this case, the logical state of a failure monitoring communication signal FMCU as an output signal of the OR circuit 86 turns to H. On the other hand, the microprocessor 60, when determined that a failure is detected in itself, sets the logical state of the second determination signal Sg2 to be L. In this case, the logical state of a failure monitoring communication signal FMCU turns to L.

The supervisory unit 85 has a function for monitoring whether a failure occurs in the microprocessor 60 and is configured as, for example, a watchdog counter (WDC) or a function watchdog counter (F-WDC). The supervisory unit 85, when determined that no failure is present in the microprocessor 60, sets the logical state of the first determination signal Sg1 to be L. In this case, the first and second switches 86e and 86f are maintained at OFF state and the logical state of the failure monitoring communication signal FMCU turns to H. On the other hand, the monitoring unit 85 changes the logical state of the first determination signal to be H when determined that a failure occurs in the microprocessor 60. In this case, the first and second switches 86e and 86f are turned ON and the logical state of the failure monitoring communication signal FMCU is tuned to be L. According to the present embodiment, the microprocessor 60 and the supervisory unit 85 correspond to failure determination unit.

The failure monitoring communication signal FMCU is transmitted to the power source stopping unit 87. The power source stopping unit 87 is provided with a failure detecting circuit 87a and a switch 87b. The first end of the switch 87b is connected to the ground, and the second end of the switch 87b is connected to a connection point between the first divider 96a and the second dividers 96b included in the control circuit 50. The first end of the series-connected body composed of the first and second dividers 96a and 96b is connected to the input circuit 61 and the second end of this series-connected body is connected to the ground. The UVLO terminal of the insulation power source 80 is connected to the connection point between the first divider 96a and the second divider 96b. The control unit of the insulation power source 80 performs, when determined that a determination voltage Vjin transmitted to the connection point is lower than a low voltage threshold VUVLO, a low voltage erroneous operation prevention process for stopping the insulation power source 80. On the other hand, the control unit of the insulation power source 80, when determined that the transmitted determination voltage Vjin exceeds a release threshold (<VB) which is higher than the low voltage threshold VUVLO, stops the low voltage erroneous operation prevention process and resumes the operation of the insulation power source 80.

The failure detecting circuit 87a is configured to be capable of operating by being supplied with the fourth voltage V4r of the fourth low voltage power source circuit 66. The failure detecting circuit 87a turns the switch 87a to be OFF when determined that the logical state of the emergency monitoring communication signal FMCU is H. In this case, the determination voltage Vjin is larger than or equal to the low voltage threshold VUVLO. On the other hand, the failure detecting circuit 87a turns the switch 87b to be ON when determined that the logical state of the emergency monitoring communication signal FMCU is L. In this case, the determination voltage Vjin is less than the low voltage threshold VUVLO and the low voltage erroneous operation prevention process is performed. Once this process is performed, the insulation power source 80 is stopped and the upper arm drive voltage VdH and the lower arm drive voltage VdL start to gradually decrease to 0V.

According to the present embodiment, even when a failure occurs in the control circuit 50 which causes the shutdown state in conventional configuration, the three-phase short circuit control can be performed. The shutdown state refers to a state in which three-phase upper and lower arm switches SWH and SWL are OFF. Here, the failure in the control circuit 50 includes a failure of the microprocessor 60, at least one of failures in the intermediate power source circuit 62 and the first to third low voltage power source circuits 63 to 65, a failure in which a switching command cannot be correctly transmitted to the upper and lower arm driver 81 and 82 from the microprocessor 60 and a failure in which the voltage cannot be outputted from the insulation power source 80. The failure in which the voltage cannot be outputted from the insulation power source 80 includes a failure of the insulation power source 80 and a failure in which the low voltage power source 31 cannot supply power to the insulation power source 80. Here, the failure in which the low voltage power source 31 cannot supply power to the insulation power source 80 occurs when an electrical path from the low voltage power source 31 to the insulation power source 80 such as the input circuit 61 or the like is broken. When describing a case where a failure occurs in the lower arm driver 82, for example, the failure in which the switching command cannot be correctly transmitted includes a failure in which a signal path from the microprocessor 60 to the lower arm insulation transmission 82*b* is broken. Note that the above-described failures may occur in the case of a vehicle collision.

Figure 12:
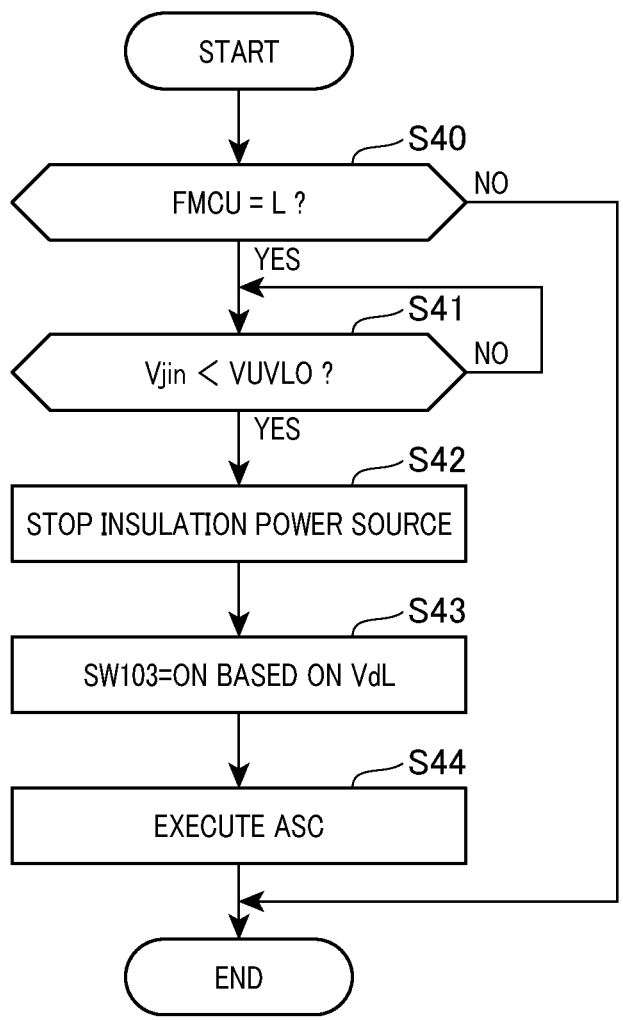
FIG. 12 is a flowchart showing a procedure of the three-phase short circuit control.

With reference to FIG. 12, a three-phase short circuit control executed when a failure occurs in the control circuit 50 will be described.

At step S40, the failure detecting circuit 87*a* of the power source stopping unit 87 determines whether the logical state of the transmitted emergency monitoring communication signal FMCU is L. In the case where the second determination signal Sg2 outputted from the microprocessor 60 is L, or the first determination signal Sg1 outputted from the supervisory unit 85 is H, the logical state of the emergency monitoring communication signal FMCU turns to L. Also, when a failure occurs in the intermediate power source circuit 62 or the first to third low voltage power source circuits 63 to 65 as the power sources for the microprocessor 60, the logical state of the second determination signal Sg2 outputted from the microprocessor 60 turns to L. Note that the emergency monitoring communication signal FMCU corresponds to regeneration prevention command according to the present embodiment.

The failure detecting circuit 87*a* turns the switch 87*b* to be ON when determined that the logical state of the emergency monitoring communication signal FMCU is L. Thus, the determination voltage Vjin transmitted to the UVLO terminal of the insulation power source 80 decreases to 0V as the ground potential.

At step S41, the power source control unit of the insulation power source 80 waits until the determination voltage Vjin becomes lower than the low voltage threshold VUVLO. The power source control unit, when determined that the determination voltage Vjin is lower than the low voltage threshold VUVLO, performs the low voltage erroneous operation prevention process at step S42 and stops the insulation power source 80. Thus, the upper and lower arm drive voltages VdH and VdL outputted from the insulation power source 80 starts to decrease to 0V.

At step S43, the high voltage side ASC command unit 91 detects the lower arm drive voltage VdL outputted from the insulation power source 80 and turns the emergency switch 103 to be ON after the detected lower arm drive voltage VdL starts to decrease. Thus, the emergency power source 90 starts to directly supply the emergency drive voltage Veps to the gates of the respective lower arm switches SWL via the emergency switch 103, the common path 104 and the second regulation diode 105.

Specifically, the high voltage side ASC command unit 91 turns the emergency switch 103 to be ON when sufficient time elapses to turn the upper arm switch SWH to be OFF after the detected lower arm drive voltage VdL starts to decrease. This is to avoid occurrence of short circuit between the upper arm circuit and the lower arm circuit.

For example, the high voltage side ASC command unit 91 may turn the emergency switch 103 to be ON when determined that the detected lower arm drive voltage VdL is lower than the predetermined voltage Vp after the detected lower arm drive voltage starts to decrease. The predetermined voltage Vp is set to be a value capable of determining that a sufficient time elapses to allow the upper arm switch SWH to be OFF. For example, the predetermined voltage Vp may be set to be the same value as the above-described threshold voltage Vth or a value less than the threshold voltage Vth.

Further, the high voltage side ASC command unit 91 may turn the emergency switch 103 to be ON when a predetermined period elapses after the detected lower arm drive voltage VdL starts to decrease.

Here, the predetermined period may be set to be a value capable of determining that a sufficient time elapses to allow the upper arm switch SWH to be OFF.

The emergency switch 103 is turned ON, thereby turning the three-phase lower arm switches SWL to be ON. That is, the lower arm switches SWL as the three-phase ON side switches are turned ON. Further, since the upper drive voltage VdH to be supplied to the upper arm drive unit 81*a* decreases, the upper arm switches SWH as the three-phase upper arm switches are turned OFF. As a result, the three-phase short circuit control is executed at step S44.

Figure 13:
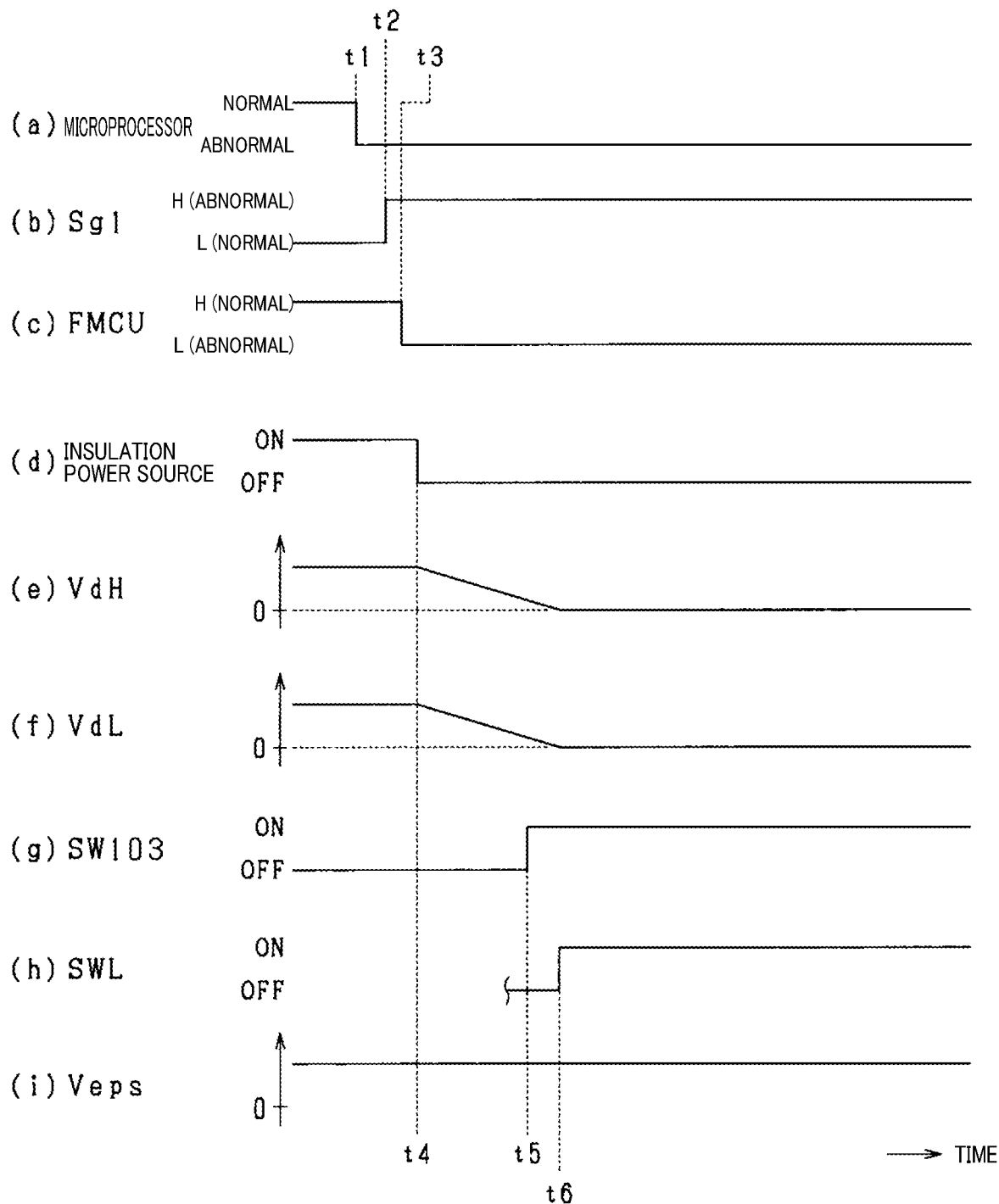
FIG. 13 is a timing diagram showing an example of the three-phase short circuit control.

With reference to FIG. 13, a process shown in FIG. 12 will be described in more detail. A timing (a) in FIG. 13 shows a trend of whether a failure is present in the microprocessor 60, a timing (b) in FIG. 13 shows a trend of the first determination signal Sg1 outputted from the supervisory unit 85, a timing (c) shows a trend of the emergency monitoring communication signal FMCU and a timing (d) shown in FIG. 13 shows a trend of an operational state of the insulation power source 80. The timings (e) and (f) show a trend of the upper and lower arm drive voltages VdH and VdL outputted from the insulation power source 80, a timing (g) in FIG. 13 shows a trend of the drive state of the emergency switch 103, a timing (h) in FIG. 13 shows a trend of the drive state of the lower arm switches SWL in respective phases. Also, a timing (i) in FIG. 13 shows a trend of the emergency drive voltage Veps of the emergency power source 90.

At time t1, a failure occurs in the microprocessor 60. Hence, at time t2, the logical state of the first determination signal Sg1 outputted from the supervisory unit 85 is inverted to H and the logical state of the emergency monitoring communication signal FMCU is inverted to L at time t3. As a result, the switch 87*b* turns to ON and the low voltage erroneous operation prevention process is executed. Thus, at time t4, the insulation power source 80 is stopped and the upper and lower drive voltages VdH and VdL start to decrease.

After the lower arm drive voltage VdL starts to decrease, at time t5 at which a sufficient time elapses from time t4 to allow the upper arm switch SWH to be OFF, the high voltage ASC command unit 91 turns the emergency switch 103 to be ON. Since the emergency drive voltage Veps is controlled to be at the target voltage through the entire period in FIG. 13, when turning the emergency switch 103 to be ON, the emergency power source 90 starts to supply power to the gate of the respective lower arm switches SWL. Hence, the three-phase lower arm switches SWL are tuned ON at time t6. The determination whether the sufficient time elapses may be made, as described above, by determining whether the lower arm drive voltage VdL is lower than the predetermined voltage Vp or determining whether a predetermined period elapses from a time when the lower arm drive voltage VdL starts to decrease.

Note that the three-phase short circuit control is executed by the processes at steps S41 to S44 also in the case where a failure occurs in the low voltage power source 31 or a failure occurs in the input circuit 61 or a power supply path electrically connecting the low voltage power source 31 and the control circuit 50 is broken or a failure occurs in the insulation power source 80. That is, in this case, the low voltage erroneous operation prevention process stops the insulation power source 80, the upper and lower arm drive voltages VdH and VdL decrease to 0V and the three-phase short circuit control is performed.

Moreover, also when an over voltage failure occurs, the three-phase short circuit control is performed. Specifically, the state determination unit 79 determines whether an over voltage signal from the over voltage detecting unit 78 is transmitted and accepted thereby. The state determination unit 79 outputs the low voltage side ASC command CmdASC to the low voltage side ASC command unit 84, when determined that an over voltage signal is transmitted.

The low voltage side ASC command unit 84, when accepting the low voltage side ASC command CmdASC, outputs a shutdown command CmdSDN that forcibly changes the switching command transmitted to the three-phase upper arm drivers 81 to be OFF command regardless of the switching command outputted from the microprocessor 60. Also, the low voltage side ASC command unit 84 forcibly changes the switching command transmitted to the three-phase lower arm drivers 82 to be ON command regardless of the switching command outputted from the microprocessor 60. Thus, the three-phase short circuit control is executed.

Referring back to FIG. 9, the control circuit 50 is provided with a discharge processing unit 110. The discharge processing unit 110 is disposed in the high voltage region of the control circuit 50 and is configured to execute the discharge control for the smoothing capacitor 24 by driving the discharge switch 29. The discharge processing unit 110 performs a discharge control of the smoothing capacitor 24 when determined that the discharge command CmdAD is transmitted from the microprocessor 60.

According to the present embodiment, the microprocessor 60, when determined that a power regeneration has been occurred in the case where a failure occurs in the control system, outputs an ON command to the three-phase lower arm switches SWL, an OFF command to the three-phase upper arm switches SWH and a relay OFF command to the relay controller 45 so as to turn the first and second cutoff switches 23a and 23b to be OFF after the three-phase lower arm switches SWL are turned ON and the three-phase upper arm switches SWH are turned OFF.

Figure 14:
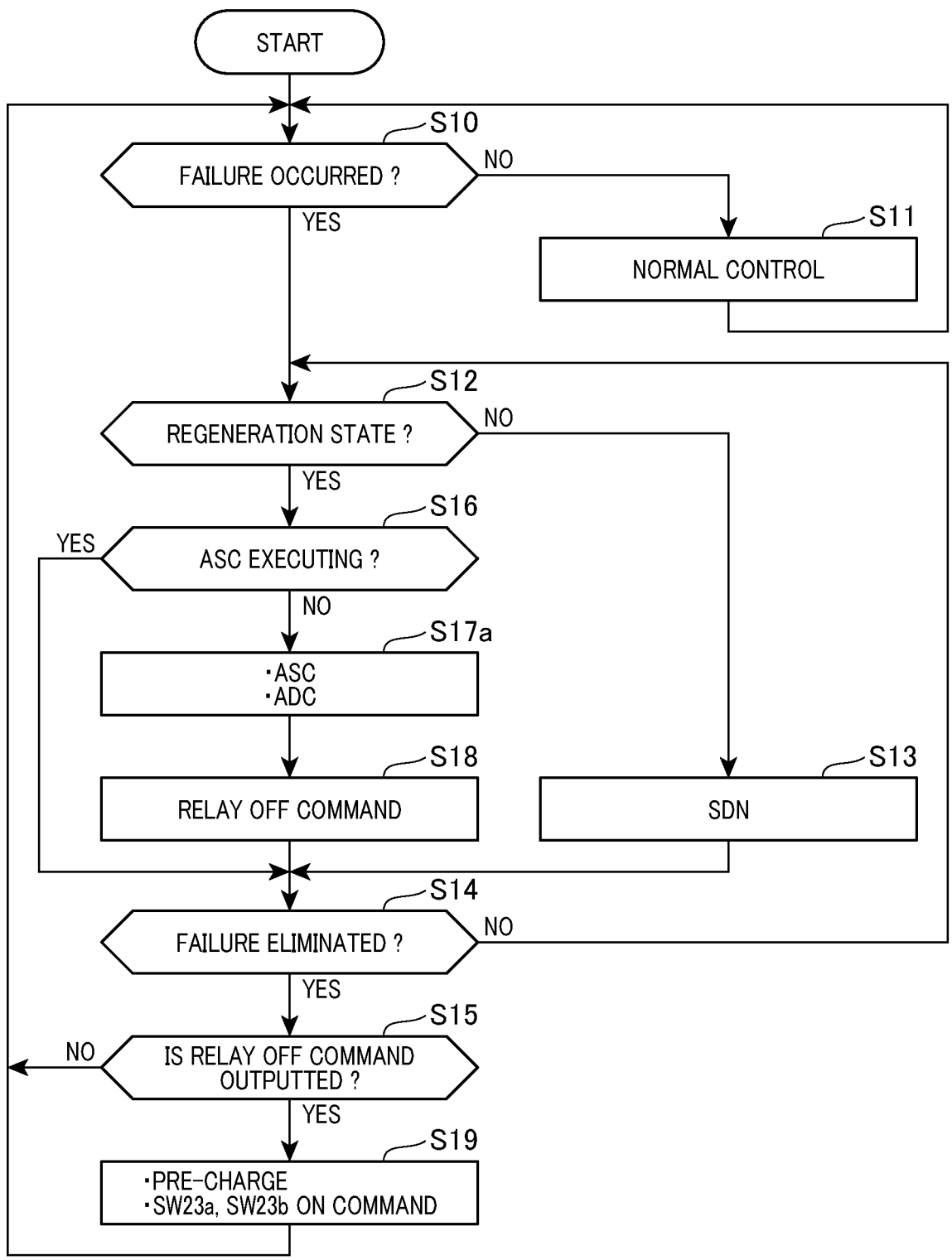
FIG. 14 is a flowchart showing a procedure of the three-phase short circuit control and the shutdown control executed by the microprocessor.

With reference to FIG. 14, the three-phase short circuit control process and the shutdown control process executed by the microprocessor 60 will be described. In FIG. 14, the same reference symbols are applied to configurations same as those shown in FIG. 4 for the sake of convenience.

The determination at step S16 is negative, the process proceeds to step S17a and outputs an ON command to the three-phase lower arm switches SWL and OFF command to the three-phase upper arm switches SWH.

At step S17a, the process outputs the discharge command CmdAD to the discharge processing unit 110. Thus, the discharge switch 29 is continuously or intermittently in ON state and is capable of consuming the regeneration power generated at the winding 11 at the discharge resistor 26. As a result, the terminal voltage at the smoothing capacitor 24 can be prevented from increasing. After completing the process at step S17a, the process proceeds to step S18.

Also in the case where the high voltage side ASC command unit 91 executes the three-phase short circuit control, the discharge processing unit 110 may execute the discharge control.

Referring back to FIG. 11, the control circuit 50 is provided with a filter 46. The filter 46 is disposed in the low voltage region of the control circuit 50. The filter 46 is used for a configuration in which the first and second cutoff switches 23a and 23b are turned OFF after the three-phase lower arm switches SWL are turned ON and the three-phase upper arm switches SWH are turned OFF when the logical state of the emergency monitoring communication signal FMCU turns to L. The filter 46 is a low-pass filter, for example and configured to delay the emergency monitoring communication signal FMCU outputted from the OR circuit 86 and outputs the delayed signal to the relay controller 45. Specifically, the filter 46 turns the logical state of the emergency monitoring communication signal FMCU outputted to the relay controller 45 to be L from H, at a time delayed by predetermined time from a time when the logical state of the emergency monitoring communication signal FMCU outputted from the OR circuit 86 turns to L from H. The relay controller 45 outputs the relay OFF command when the logical state of the emergency monitoring communication signal FMCU turns to L. Note that the microprocessor 60, the supervisory unit 85, the OR circuit 86, the relay controller 45 and the filter 46 correspond to emergency control unit according to the present embodiment.

Figure 15:
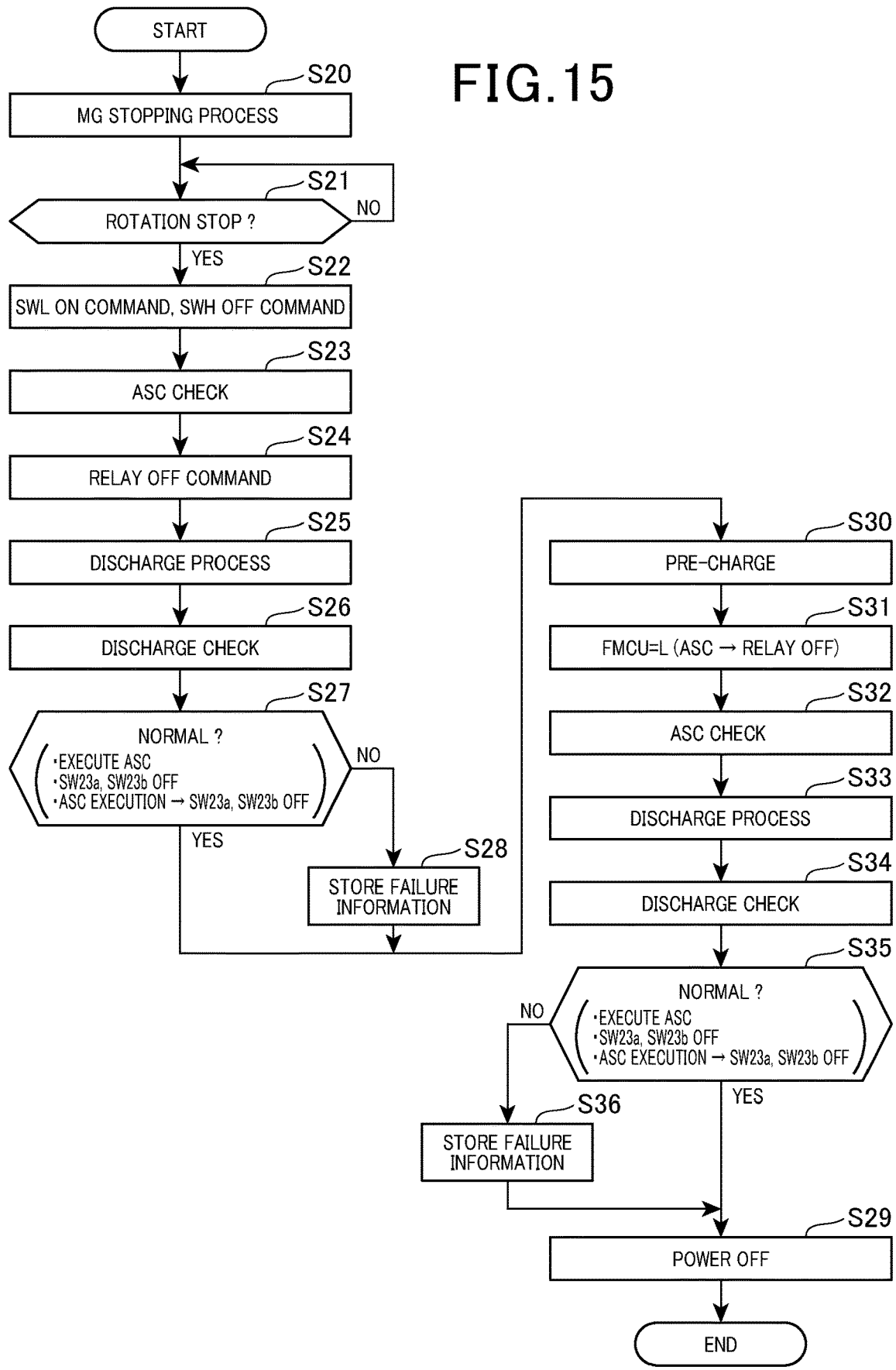
FIG. 15 is a flowchart showing a procedure of the checking process executed by the microprocessor.

Next, with reference to FIG. 15, a checking process for determining whether the three-phase short circuit control, and a process of changing the states of the first and second switches 23a and 23b to be OFF is executed in this order. This checking process is executed by the microprocessor 60. In FIG. 15, the same reference symbols are applied to configurations same as those shown in FIG. 6 for the sake of convenience.

In steps S20 to S28, the same processes as those described in the first embodiment are performed.

When completing the process at step S28, or the determination at step S27 is affirmative, the process proceeds to step S30. At step S30, the process outputs a pre-charge command to the relay controller 45. Thus, the high voltage power source 30 supplies charges to the smoothing capacitor 24 and the terminal voltage of the smoothing capacitor 24 increases. According to the present embodiment, the process continues to execute the pre-charge process until the terminal voltage of the smoothing capacitor 24 reaches a value close to the terminal voltage of the high voltage power source 30.

Next at steps S31 to S36, a case where the emergency monitoring communication signal turns to L is simulated, thereby determining whether the three-phase short circuit control and a process for turning the first and second cutoff switches 23a and 23b to be OFF, can be executed in this order.

In more detail, at step S31, as a process for simulating the process that executes when determined that a failure occurs in the control system, a process is executed for turning the logical state of the emergency monitoring communication signal FMCU to be L. This process may be a process executed by the microprocessor 60 for turning the logical state of the second determination signal Sg2 to be L, or a process executed by the microprocessor to cause the supervisory unit 85 to change the logical state of the first determination signal Sg1 outputted by the supervisory unit 85 to be H. According to the present embodiment, the power source stopping unit 87, the insulation power source 80, the high voltage side ASC command unit 91, the emergency switch 103 and the common path 104 correspond to regeneration prevention unit.

Next at step S32, the process checks whether the three-phase lower arm switches SWL are turned ON and whether the three-phase upper arm switch SWH are turned OFF by the process at step S31. Here, as a method for checking at step S23, for example, a checking process described in the step S23 of the first embodiment may be used. The process determines that the three-phase short circuit control can be correctly executed, when determines at step S32 that the three-phase lower arm switches SWL are ON and the three-phase upper arm switch SWH are OFF.

Next at step S33, the discharge process similar to step S25 is executed. At step S34, the process determines whether the first and second cutoff switches 23a and 23b are OFF by the process at step S31. Here, as a method for checking at step S34, for example, a checking process described in the step S26 of the first embodiment may be used.

Next at step S35, the process determines whether conditions A to C are all met. The A condition is satisfied when it is determined that a three-phase short circuit control is correctly executed at step S32. The B condition is a condition that determines that the first and second cutoff switches 23a and 23b are turned OFF at step S34. The condition C is that it is determined that the first and second cutoff switches 23a and 23b are turned OFF after the three-phase short circuit control is executed. The determination whether the C condition is met may be determined based on the determination results at steps S32 and S34.

When determined that at least one condition is not met in the A to C conditions at step S35, at least one failure has been occurred among a failure in which the three-phase short circuit control cannot be executed correctly, a failure in which the first and second cutoff switches 23a and 23b cannot be turned OFF and a failure in which the three-phase short circuit control and turning OFF the first and second cutoff switches 23a and 23b cannot be executed in this order. In this case, at step S36, information indicating occurrence of failure is stored into the memory 60a. Thereafter, the process proceeds to step S29. Note that a process for notifying the user of the information indicating occurrence of failure may be performed at step S36. According to the present embodiment, the process at step S31 corresponds to processing unit, processes at steps S32, S34 and S35 correspond to checking unit, and a process at step S33 corresponds to discharge processing unit.

When determined that the conditions A to C are all met at step S35, the process determines that the three-phase short circuit control and the first and second cutoff switches 23a and 23b are tuned to be OFF can be correctly executed in this order. Then, the process proceeds to step S29.

Similarly, with the present embodiment as described above, when determined that a failure has occurred in the control system, the first and second cutoff switches 23a and 23b can be turned OFF after executing the three-phase short circuit control.

Modification of Second Embodiment

In the case where the logical state of the emergency monitoring communication signal FMCU turns to L, the filter 46 is not necessary for the configuration in which the first and second cutoff switches 23a and 23b are turned OFF after the three-phase lower arm switch SWL are turned ON and the three-phase upper arm switched SWH are turned OFF.

For example, as a signal path of the emergency monitoring communication signal FMCU outputted from the OR circuit 86, a configuration may be utilized in which a signal path that connects the OR circuit 86 and the emergency detecting circuit 87a, and a signal path that connects the OR circuit 86 and the relay controller 45 are separately provided. In this configuration, the OR circuit 86 may change the logical state of the emergency monitoring communication signal FMCU outputted to the relay controller 45 to be L after changing the logical state of the emergency monitoring communication signal FMCU outputted to the emergency detecting circuit 87a to be L.

Further, for example, a configuration may be utilized in which a common signal path with which the emergency monitoring communication signal FMCU outputted from the OR circuit is transmitted, and signal paths branched from the common signal path, each being connected to emergency detecting circuit 87a and the relay controller 45 are provided. According to the present configuration, in the case where a capacitor that supplies the power to the relay controller 45 is provided, the capacitance of the capacitor may be determined such that the logical state of the emergency monitoring communication signal FMCU transmitted to the relay controller 45 is turned to L after changing the logical state of the emergency monitoring communication signal FMCU transmitted to the emergency detecting circuit 87a.

In the steps S25 and S33 shown in FIG. 15, discharge of the smoothing capacitor 24 may be prompted by executing at least one of a process causing the current to flow through the winding 11 from the switching device unit 20, a process that drives the electrical equipment 25, and a process that turns the discharge switch 29 to be ON.

The discharge processing unit 110 may not be provided in the control circuit 50.

Each of the switches 23a and 23b may have a function for monitoring the drive state itself and the monitored drive state may be transmitted to the microprocessor 60. In this case, instead of steps S25 and S26, and steps S33 and S34 shown in FIG. 15, the microprocessor 60 may execute a process determining that the respective cutoff switches 23a and 23b are turned OFF when the monitored drive state is OFF state.

In the process shown in FIG. 15, the processes at steps S20 to S28 may be executed via the step S30 after executing the processes at steps S31 to S26.

In the processes shown in FIG. 15, both the processes at steps S20 to S28 and the processes at steps S31 to S26 are not necessarily executed in one end sequence. For example, the processes at steps S20 to S28 and the processes at steps S31 to S26 may be alternately executed, The high voltage side ASC command unit 91 may turn the emergency switch 103 to be OFF based on the upper arm drive voltage VdH instead of the lower arm drive voltage VdL. In this case, the high voltage side ASC command unit 91 may acquire the upper arm drive voltage VdH via the insulation transmission unit.

The power source control unit that constitutes the insulation power source 80 may be provided for each of the upper arm insulation power source and the lower arm insulation power source separately. In this case, the low voltage erroneous operation prevention process may stop both of the power source control unit provided corresponding to the upper arm insulation power source and the power source control unit provided corresponding to the lower arm insulation power source, whereby the insulation power source 80 is stopped.

As the three-phase short circuit control executed by the high voltage side ASC command unit 91, a process for controlling the three-phase upper arm switches SWH to be ON and the three-phase lower arm switches SWL to be OFF may be executed. In this case, the emergency power source 90 may be provided for each of the three-phase upper arm drive unit 81*a* separately.

Third Embodiment

Figure 16:
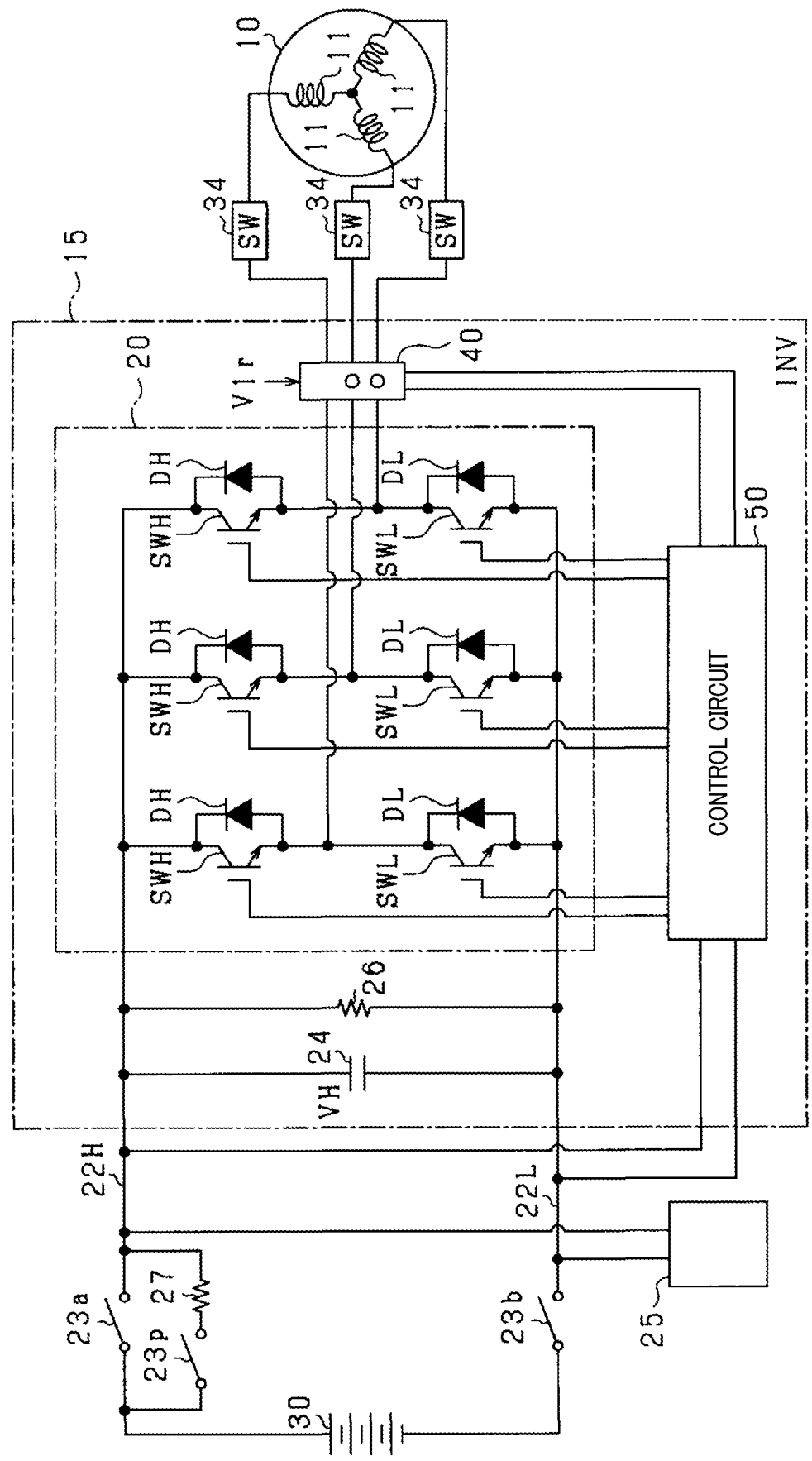
FIG. 16 is a diagram showing an overall configuration of a control system according to a third embodiment.

Hereinafter, for the third embodiment, with reference to the drawings, a configuration different from that in the first embodiment will be mainly described. According to the present embodiment, as shown in FIG. 16, the control system is provided with a change-over switch 34. In FIG. 16, the same reference symbols are applied to configurations same as those shown in FIG. 1 for the sake of convenience.

The change-over switch 34 is provided on a conduction path (e.g. bus bar) that connects the connection point between the upper arm switch SWH and the lower arm switch SWL in each phase and the first end of the winding 11 in each phase.

The microprocessor 60 executes a change-over control that outputs the OFF command or the ON command to the change-over switch 34 in each phase. Thus, the change-over switch 23 in each phase is in OFF state or ON state. According to the present embodiment, the process of the microprocessor 60 that outputs OFF command or ON command to the change-over switch 34 corresponds to regeneration prevention unit.

Figure 17:
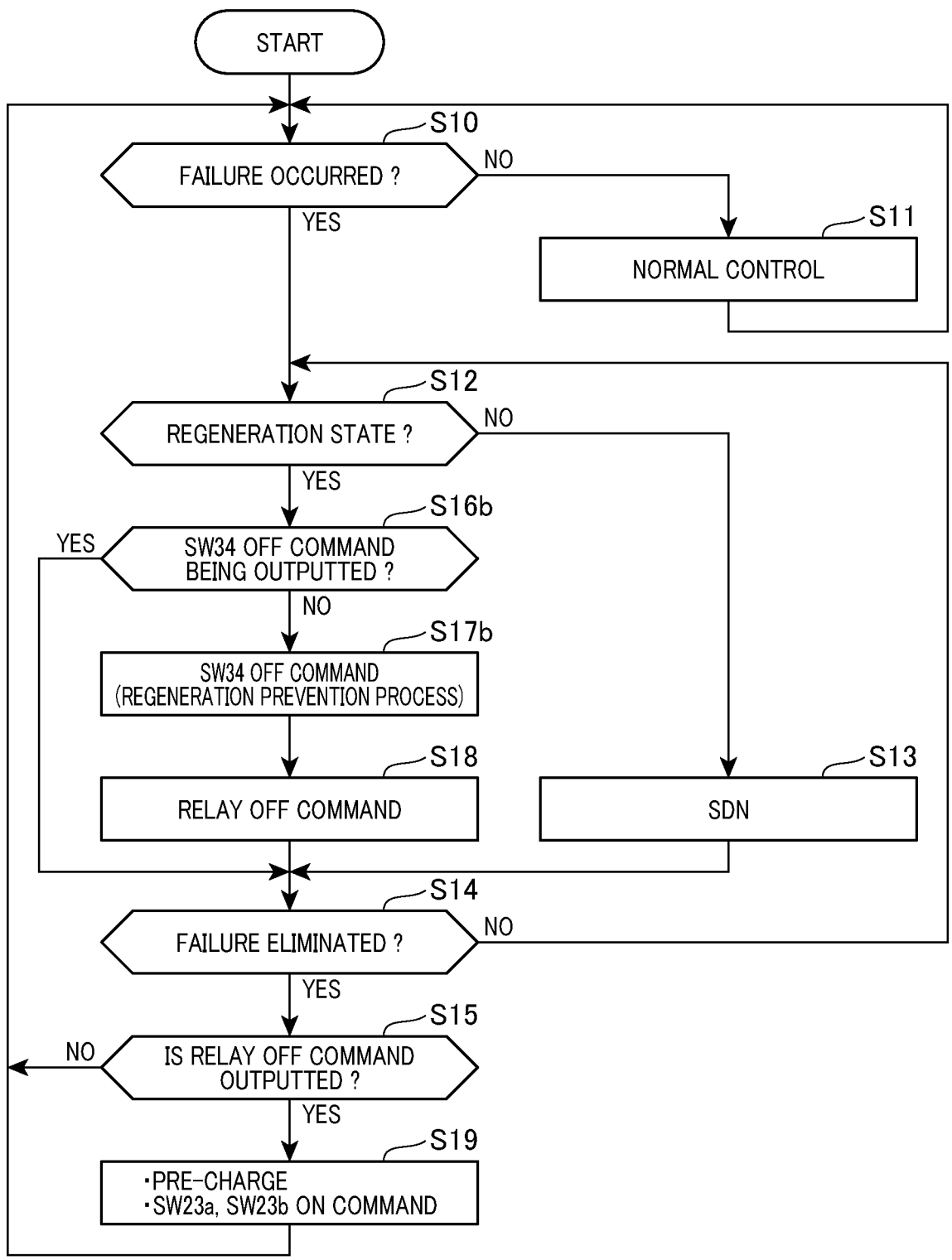
FIG. 17 is a flowchart showing a procedure of processes executed by the microprocessor.

With reference to FIG. 17, a process executed by the microprocessor 60 will be described. In FIG. 17, the same reference symbols are applied to configurations same as those shown in FIG. 4 for the sake of convenience.

When determined that no failure is present at step S10, the process proceeds to step S11, and performs normal control. According to the present embodiment, when performing the normal control, the change-over switch 34 in each phase is set to be ON.

At step S10, when determined that a failure has occurred, the process proceeds to step S12. At step S12, when determined that power regeneration has occurred, the process proceeds to step S16*b*. At step S16*b*, the process determines whether the ON command is outputting to the change-over switch 34 in each phase.

At step S16*b*, when determined that the OFF command is outputting to the change-over switch 34 in each phase, the process proceeds to step S14. On the other hand, when determined at step S16*b* that the ON command is outputting to the change-over switch 34 in each phase, the process proceeds to step S17*b*. At step S17*b*, the process outputs the OFF command (execution command of change-over control) to the change-over switch 34 in each phase. Once the process at step S17*b* is executed, the determination at step S16*b* in the next cycle will be affirmative. After completing the process at step S17*b*, the process proceeds to step S18.

According to the process shown in FIG. 17, the first and second cutoff switches 23*a* and 23*b* are turned OFF after turning OFF the change-over switches 34 in respective phases. Thus, in the case where a failure occurs in the control system and power regeneration is likely to occur, the terminal voltage of the smoothing capacitor 24 can be prevented from rapidly increasing.

Figure 18:
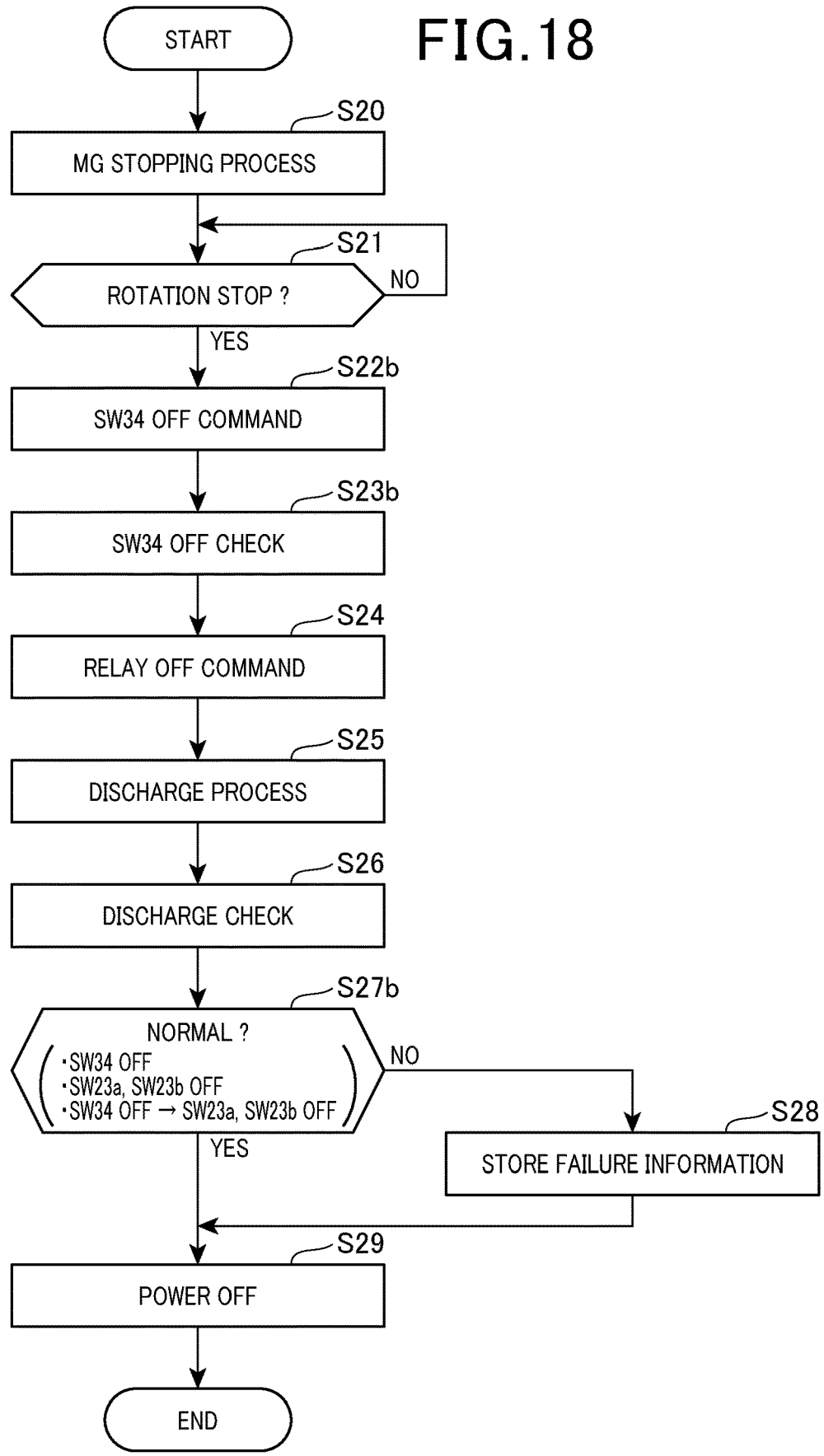
FIG. 18 is a flowchart showing a procedure of a checking process executed by the microprocessor.

Next, with reference to FIG. 18, a checking process will be described. The checking process is for checking whether a process of changing the change-over switch 34 to be OFF and a process of changing the first and second cutoff switches to be OFF can be executed in this order. This process is executed by the microprocessor 60. In FIG. 18, the same reference symbols are applied to configurations the same as those shown in FIG. 6 for the sake of convenience.

At step S22*b*, a process is executed for simulating the process that executes when determined that a failure occurs in the control system. Specifically, OFF command is outputted to the change-over switches 34 in respective phases.

At step S23*b*, the process checks whether the change-over switches 34 in respective phase are OFF by the process at step S22*b*. Here, for example, in the case where the change-over switch 34 is configured as a voltage-controlled type semiconductor switching element, the process may determine that the change-over switch 34 is OFF when determined that the gate voltage of the change-over switch 34 is less than or equal to the above-described OFF determination voltage. Further, for example, in the case where the change-over switch 34 is configured as a relay having a monitoring function of the drive state, the process may determine whether the change-over switch 34 is OFF based on the monitored drive state. After completing the process at step S23*b*, the process proceeds to step S24.

At step S27*b*, the process determines whether the sixth to eighth conditions are all met. The sixth condition is satisfied when determined that the change-over switches 34 in respective phases can be turned OFF. The seventh condition is the same as the above-described second condition. The eighth condition is a condition that determines that the first and second cutoff switches 23*a* and 23*b* are turned OFF after turning the change-over switch 34 to be OFF. The determination whether the eighth condition is satisfied, may be made based on the determination results of steps S23*b* and 26, for example.

According to the above-described embodiment, effects and advantages similar to those in the first embodiment can be achieved.

Modifications of Third Embodiment

In the process shown in FIG. 17, the processes of steps S12 and S13 may be removed. In this case, the determination at step S10 is affirmative, the process may proceed to step S16*b*. This is based on a fact that turning of the change-over switches 34 to be OFF may serve as the same function as the shutdown control.

The change-over switches 34 for two-phases not the all of three-phases may be turned OFF.

The change-over switch 34 provided in the control system may be for two phases not three phases.

Fourth Embodiment

Figure 19:
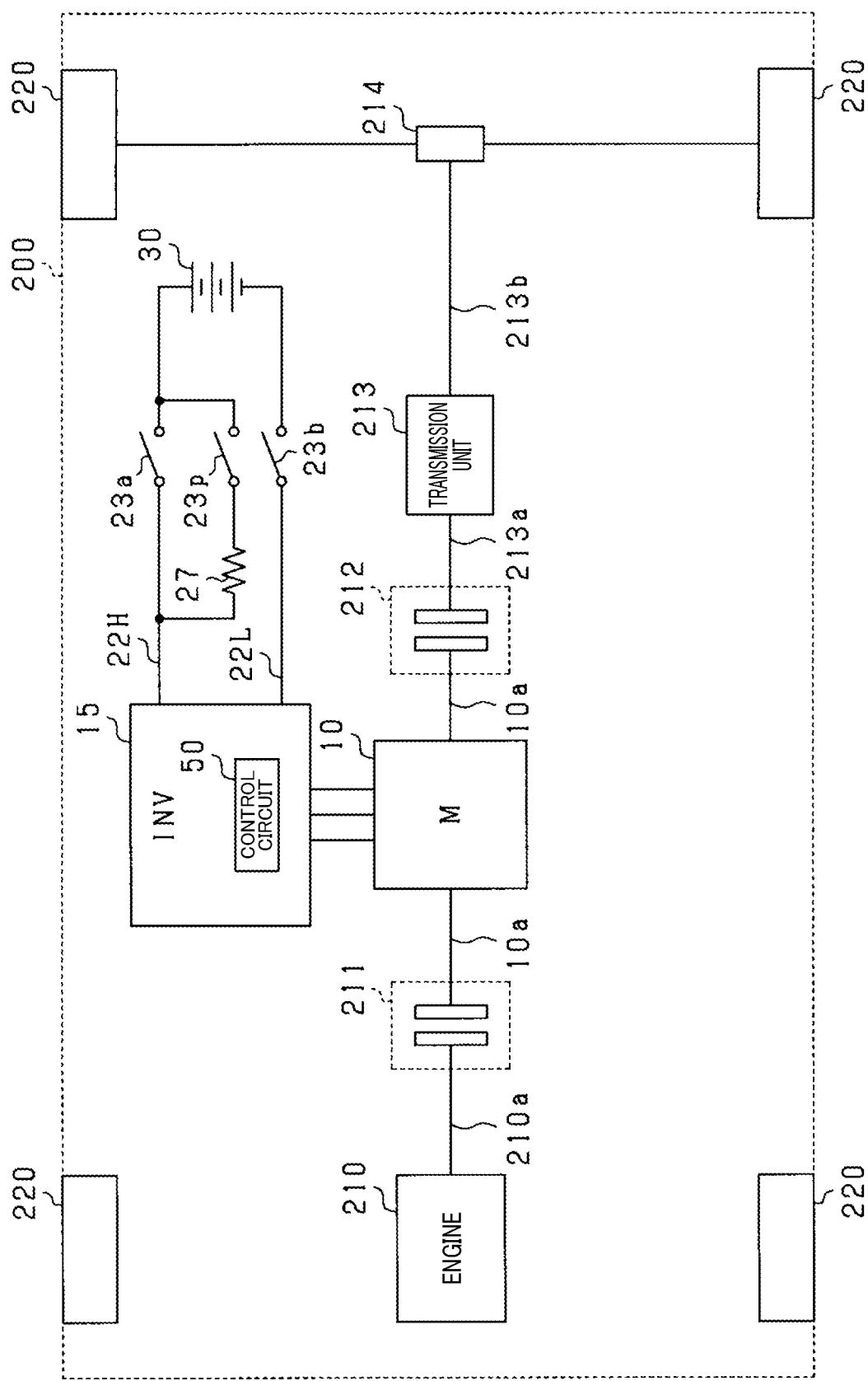
FIG. 19 is a diagram showing an overall configuration of a control system according to a fourth embodiment.

Hereinafter, for the fourth embodiment, with reference to the drawings, a configuration different from that in the first embodiment will be mainly described. According to the present embodiment, a control system is mounted on a vehicle 200 (corresponds to mobile body) shown in FIG. 19. In FIG. 19, the same reference symbols are applied to configurations same as those shown in FIG. 1 or corresponding configurations shown in FIG. 1 for the sake of convenience.

The vehicle 200 is provided with a control system of 1 motor and 2 clutches. The vehicle 200 is provided with an internal combustion engine 210 as a travelling drive source in addition to the rotary electric machine 10. Also, the vehicle 200 is provided with a first clutch 211, a second clutch 212, a transmission apparatus 213, s differential gear 214 and wheels 220. The transmission unit 213 is CVT, for example.

An output shaft 210a (e.g. clunk shaft) of the internal combustion engine 210 is connected to a rotation shaft 10a of the rotor that constitutes the rotary electric machine 10. The first clutch 211 is controlled, thereby selecting either a driving force transmission state or a driving force cutoff state between the output shaft 210a as the drive shaft and the rotation shaft 10a. The first clutch 211 is controlled by the host ECU (not shown) provided in the vehicle 200.

For the rotation shaft 10a, a first rotation shaft 213a of the transmission unit 213 is connected to the rotation shaft 10a via a second clutch 212. In the transmission apparatus 213, a transmission ratio as a ratio between the rotation speed of the first rotation shaft 213a and the rotation speed of the second rotation shaft 213b is controlled to be a target transmission ratio. The second clutch 212 is controlled, thereby selecting either a driving force transmission state or a driving force cutoff state between the first rotation shaft 213a as the drive shaft and the rotation shaft 10a of the rotary electric machine 10. The second clutch 212 is controlled by the host ECU. According to the present embodiment, the microprocessor 60 that constitutes the control circuit 50 is capable of commanding the host ECU to control the first and second clutches 211 and 212.

According to the present embodiment, the processes of the microprocessor 60 that controls the first and second clutches 211 and 212 correspond to regeneration prevention unit.

Figure 20:
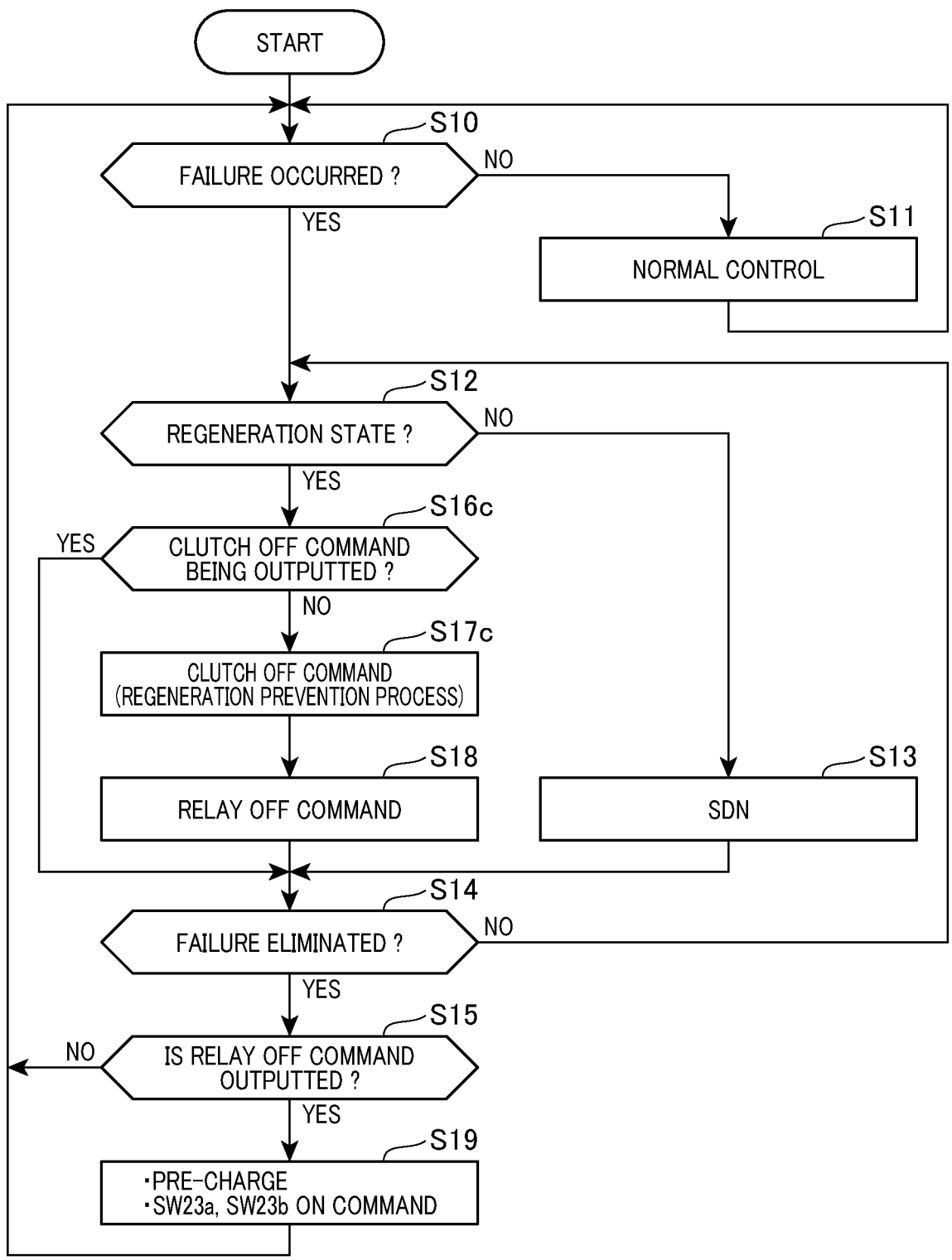
FIG. 20 is a flowchart showing a procedure of processes executed by the microprocessor.

With reference to FIG. 20, a process executed by the microprocessor 60 will be described. In FIG. 20, the same reference symbols are applied to configurations the same as those shown in FIG. 4 for the sake of convenience.

In the case where the process determines at step S10 that no failure has occurred, the process proceeds to step S11 and performs a normal control. According to the present embodiment, under the normal control, in the case where only the rotary electric machine 10 is used as a travelling drive source among the rotary electric machine 10 and the internal combustion engine 210, the process controls the second clutch 212 to be in the driving force transmission state and the first clutch 211 to be in the driving force cutoff state, for example. Moreover, under the normal control, in the case where both of the rotary electric machine 10 and the internal combustion engine 210 are used as the travelling drive force, the first and second clutches are controlled to be in the driving force transmission state.

When determined at step S10 that a failure has occurred, the process proceeds to step S12. When determined at step S12 that the power regeneration has occurred, the process proceeds to step S16c.

At step S16c, the process determines whether the first and second clutches 211 and 212 are being controlled to be in the driving force cutoff state.

When determined that the first and second clutches 211 and 212 are being controlled to be in the driving force cutoff state, the process proceeds to step S14. On the other hand, when determined at step S16c that the first and second clutches 211 and 212 are being controlled such that at least the second cutch 212 is in the driving force transmission state, the process proceeds to step S17c. At step S17c, the process outputs a command to the host ECU to control the first and second clutches 211 and 212 to change the state to be the driving force cutoff state. According to the present embodiment, the process at step S17c corresponds to a process that outputs a command to execute a clutch control. When changing the state to be the driving force cutoff state, the driving force is not supplied to the rotation shaft 10a, the rotation speed of the rotor gradually decreases. As a result, power regeneration is prevented from occurring. When executing the process at step S17c, the determination at step S16c in the next cycle is affirmative. After completing the process at step S17c, the process proceeds to step S18.

According to the process shown in FIG. 20, the first and second cutoff switches 23a and 23b are turned OFF after controlling the first and second clutches 211 and 212 to be drive force cutoff state and the power regeneration is not detected anymore. Thus, the terminal voltage of the smoothing capacitor 24 can be prevented from rapidly increasing in a state where a failure has occurred and power regeneration is likely to occur.

Figure 21:
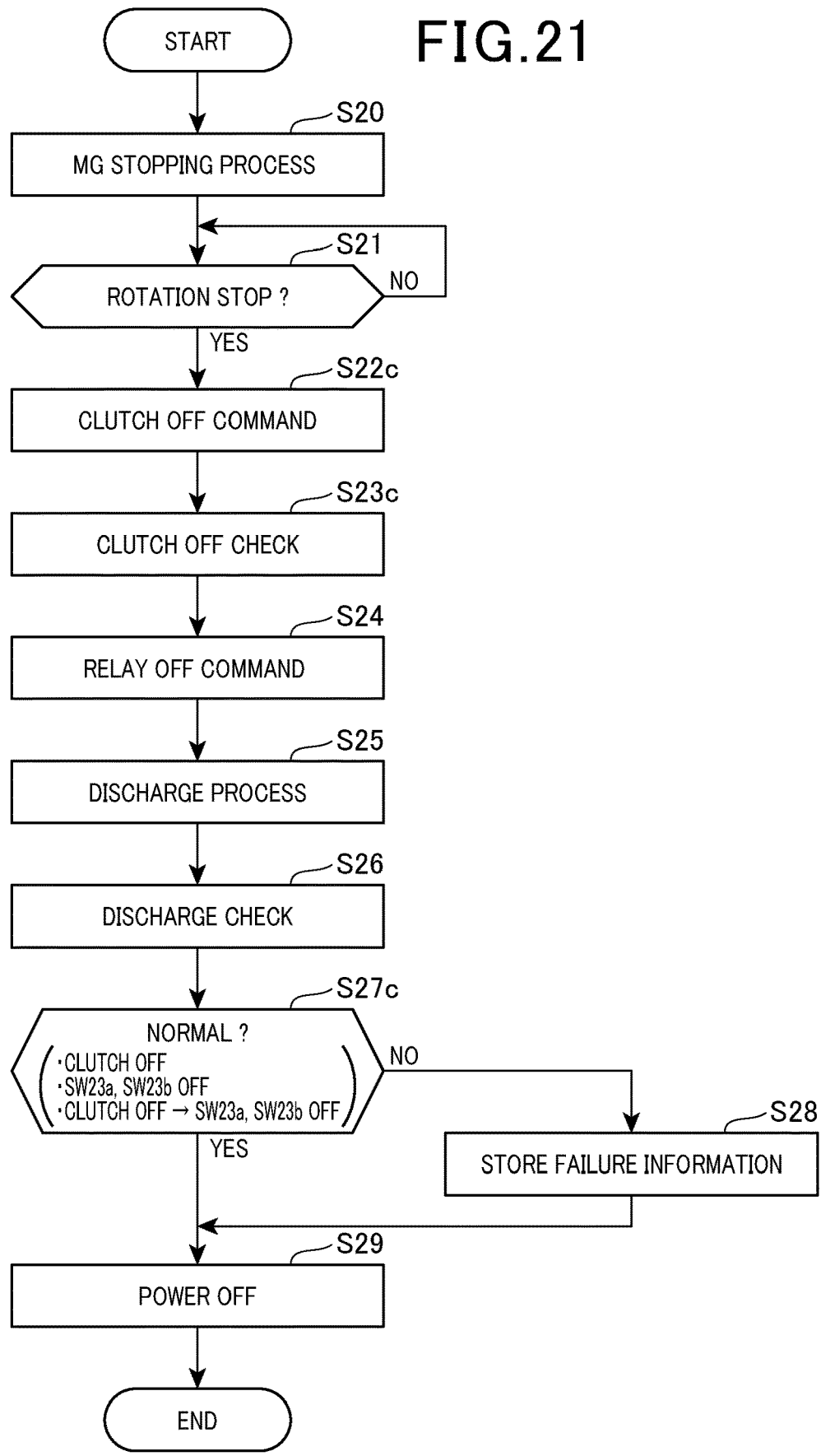
FIG. 21 is a flowchart showing a procedure of a checking process executed by the microprocessor.

Subsequently, with reference to FIG. 21, a checking process will be described. The checking process is for checking whether a process of changing the first and second clutches to be the driving force cutoff state and a process of changing the first and second cutoff switches 23a and 23b to be OFF can be executed in this order. This process is executed by the microprocessor 60. In FIG. 21, the same reference symbols are applied to configurations same as those shown in FIG. 4 for the sake of convenience.

At step S22c, a process is executed for simulating the process that executes when determined that a failure occurs in the control system. Specifically, the process outputs a command to the host ECU to control the first and second clutches 211 and 212 to change the state to be the driving force cutoff state.

At step S23c, the process determines whether the first and second clutches 211 and 212 are in the driving force cutoff state by the process at step S22c. For example, when determined that the rotation speed of the rotation shaft 10a is lowered by a predetermined rotation speed with respect to the rotation speed of the first rotation shaft 213a, the process may determine that the first and second clutches 211 and 212 are in the driving force cutoff state. After completing the process at step S23c, the process proceeds to step S24.

At step S27c, the process determines whether the ninth to eleventh conditions are all met. The ninth condition is satisfied when determined at step S23c that the state can be changed to the driving force cutoff state. The tenth condition is the same as that of the above-described second condition. The eleventh condition is satisfied when determined that the first and second cutoff switches 23a and 23b are turned OFF after changing the state to be the driving force cutoff state. The determination whether the eleventh condition is met may be determined based on the determination results of steps S23c and S26.

According to the above-described present embodiment, effects and advantages similar to those in the first embodiment can be obtained.

Other Embodiment

Note that the above-described embodiments may modified in the following manners.

Figure 22:
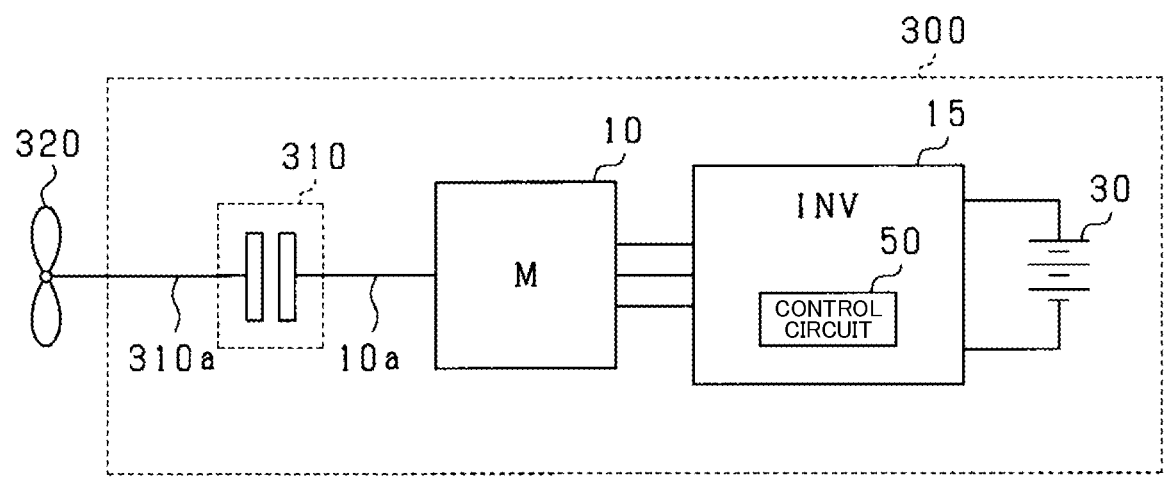
FIG. 22 is a diagram showing an overall configuration of a control system according to other embodiments.

The mobile body is not limited a vehicle, but may be an aircraft 300 provided with a rotary electric machine as a flying power source as shown in FIG. 22, for example. In FIG. 22, the same reference symbols are applied to configurations same as those shown in FIG. 19 for the sake of convenience.

The aircraft 300 is provided with a rotary electric machine 10, an inverter 15, a high voltage power source 30, a clutch 310, a drive shaft 310a and a propeller 320. Note that illustration of the first and second switches 23a and 23b or the like is omitted.

A drive shaft 310a is connected to a rotation shaft 10a of the rotary electric machine 10 via the clutch 310, and a propeller 320 is connected to the drive shaft 310a. The clutch 310 is controlled, thereby selecting either a driving force transmission state or a driving force cutoff state between the drive shaft 310a and the rotation shaft 10a. The driving force transmission state is set, thereby rotating the drive shaft 310a to cause the aircraft to fly. The microprocessor 60 that constitutes the control circuit 50 is capable of commanding the host ECU to control the clutch 310.

For the aircraft 300 as described above, the same processes as shown in FIGS. 20 and 21 can be applied.

As the mobile body, it is not limited to the aircraft, but may be vessel. In this case, referring to the above FIG. 22, the rotary electric machine 10 is a navigation power source of the vessel, and the drive shaft 310a is coupled to a screw and is cause to rotate for having the vessel navigate.

The second cutoff switch 23b may not be provided.

The first cutoff switch 23a may not be provided. In this case, the series-connected body composed of the pre-charge switch 23p and the pre-charge resistor 27 may be connected in parallel to the second cutoff switch 23a.

The first and second switches 23a and 23b and the pre-charge switch 23p may be provided in the inverter 15.

The relay controller 45 may be provided outside the inverter 15 in the control system. In this case, for example, a configuration can be applied in which the microprocessor 60 transmits a command to the relay controller 45 with any communication method. In this case, the microprocessor 60 may transmits a command to the relay controller 45 via an ECU outside the inverter 15 such as the host ECU.

The first and second switches 23a and 23b and the pre-charge switch 23p are not limited to the relay, but may be configured as a semiconductor switching element.

As the drivers 81 and 82, a driver disposed only in the high voltage region without being across a boundary portion between the low voltage region and the high voltage region may be utilized.

In the configuration shown in FIG. 1, a boost converter may be provided between the smoothing capacitor 24 and respective switches 23a, 23b, and 23p.

As a switch that constitutes the switching device unit, it is not limited to IGBT, but may be a N-channel MOSFET including a body diode, for example.

As the respective arm switches in respective phases constituting the switching device unit, two or more switches which are mutually connected in parallel. In this case, combinations of the parallel-connected switches include, for example, a combination of a SiC switching element and a Si switching element or a combination of an IGBT device and a MOSFET device.

As a controlled variable of the rotary electric machine, it is not limited to a torque but may be a rotation speed of the rotor of the rotary electric machine.

The rotary electric machine is not limited to one having one winging group, but may have a plurality of winding groups. For example, when two winding groups are provided, the rotary electric machine has six phases. Also, the rotary electric machine may be configured to have nine phases.

The rotary electric machine is not limited to a permanent magnet synchronous machine, but may be a field winding synchronous machine. Further, the rotary electric machine is not limited to a synchronous machine, but may be an induction machine. For example, in the case where a field winding synchronous machine is used as the rotary electric machine, as a process for preventing power regeneration from occurring, a process may be executed for lowering an amount of magnetic flux by lowering an amount of the field current flowing through the field winding provided in the rotor to be a predetermined current.

Here, the predetermined current may be set to be 0A or larger than 0A, for example.

As the rotary electric machine, it is not limited to a rotary electric machine used as an on-vehicle main machine, but may be utilized for other use such as a motor used for an electrical power steering apparatus or an air-conditioning electrical compressor.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computers where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

Conclusion

The present disclosure provides a control circuit of a power converter capable of protecting a storage unit and a power converter.

The present disclosure discloses a control circuit for a power converter applied to a system provided with a rotary electric machine, a power converter electrically connected to a winding of the rotary electric machine, a power source, a cutoff switch provided on an electrical path that connects the power source and the power converter, and a storage unit connected to a portion opposite to the power source on the electrical path relative to the cutoff switch. The control circuit includes: a failure determination unit that determines whether a failure occurs in the system; and a regeneration prevention unit that prevents a power regeneration, where a current flows from a rotary electric machine side towards a storage unit side, from occurring. In the case where the failure determination unit determines that a failure occurs in the system, the cutoff switch is turned OFF after the regeneration prevention unit prevents an occurrence of the power regeneration.

The present disclosure is provided with a failure determination unit that determines whether a failure occurs in the system and a regeneration prevention unit that prevents a power regeneration from occurring. In the case where the line voltage of the winding is higher than the storage unit, if the cutoff switch is turned OFF before the regeneration prevention unit prevents a power regeneration from occurring, the storage unit is likely to be charged due to the reverse voltage occurred in the rotary electric machine and may cause a rapid increase in the voltage of the storage unit. In this case, a fault may occur on at least one of the storage unit. In order to prevent such a fault from occurring, for example, the capacitance of the storage may be set to be larger. However, in this case, a cost, a size and a weight of the storage unit may be increased.

In this respect, according to the present disclosure, in the case where the failure determination unit determines that a failure has occurred, the cutoff switch is turned OFF after the regeneration prevention unit prevents a power regeneration from occulting. Thus, the voltage at the storage unit can be prevented from rapidly increasing, and the storage unit and the power converter can be protected.

What is claimed is:

1. A control circuit for a power converter applied to a system provided with a rotary electric machine, a power converter having upper and lower arm switches electrically connected to windings of respective phases of the rotary electric machine, a power source, a cutoff switch provided on an electrical path that connects the power source and the power converter, and a storage unit connected to a portion opposite to the power source on the electrical path relative to the cutoff switch, the control circuit comprising:
   a switching command generation unit that generates a switching command to be transmitted to the upper and lower arm switches so as to control a controlled variable of the rotary electric machine to be a command value, thereby performing a normal control;
   a failure determination unit that determines whether a failure occurs in the system;
   a regeneration prevention unit that prevents a power regeneration, where a current flows from a rotary electric machine side towards a storage unit side, from occurring; and
   an abnormality control unit configured to output, in the case where the failure determination unit determines that a failure occurs in the system during the normal control being performed, a regeneration prevention command to the regeneration prevention unit and a switch OFF command to the cutoff switch such that the cutoff switch is turned OFF after the regeneration prevention unit prevents an occurrence of the power regeneration, wherein
   the abnormality control unit outputs, when the failure determination unit determines that no failure occurs after outputting the regeneration prevention command to the regeneration prevention unit and the switch OFF command to the cutoff switch, a switch ON command to the cutoff switch and the switching command generation unit restarts the normal control in a state where the switch ON command maintains the cutoff switch at ON.

2. The control circuit for the power converter according to claim 1, wherein
   the regeneration prevention unit performs a short circuit control such that an ON side switch as the switch in either the upper arm or the lower arm is turned ON and an OFF side switch as the switch in the other arm to be OFF; and
   the abnormality control unit is configured to output a command for executing the short circuit control as the regeneration prevention command to the regeneration prevention unit and output the switch OFF command to the cutoff switch such that the cutoff switch is turned to be OFF after the ON side switch is turned ON and the OFF side switch is turned OFF.

3. The control circuit for the power converter according to claim 1, wherein
   the system is mounted on a mobile body;
   the system is provided with a clutch for selecting either a driving force transmission state or a driving force cutoff state between a drive shaft caused to rotate for the mobile body to travel and a rotation shaft of the rotary electric machine;
   the regeneration prevention unit is configured to control the clutch to switch between the driving force transmission state and the driving force cutoff state; and
   the abnormality control unit is configured to output a command for executing the clutch control as the regeneration prevention command to the regeneration prevention unit and output the switch OFF command to the cutoff switch such that the cutoff switch is turned OFF after a state between the drive shaft and the rotation shaft is switched to be the driving force cutoff state.

4. The control circuit for the power converter according to claim 1, wherein
   the system is provided with a change-over switch provided on a conduction path that connects a connection point of the upper and lower arm switch and the winding;
   the regeneration prevention unit is configured to perform a change-over control that turns the change-over switch to be OFF;
   the abnormality control unit is configured to output a command for executing the change-over control as the regeneration prevention command to the regeneration prevention unit and output the switch OFF command to the cutoff switch such that the cutoff switch is turned OFF after the change-over switch is turned OFF.

5. A control circuit for a power converter applied to a system provided with a rotary electric machine, a power converter electrically connected to a winding of the rotary electric machine, a power source, a cutoff switch provided on an electrical path that connects the power source and the power converter, and a storage unit connected to a portion opposite to the power source on the electrical path relative to the cutoff switch, the control circuit comprising:
   a failure determination unit that determines whether a failure occurs in the system;
   a regeneration prevention unit that prevents a power regeneration, where a current flows from a rotary electric machine side towards a storage unit side, from occurring;
   an abnormality control unit configured to output, when the failure determination unit determines that a failure occurs, a regeneration prevention command to the regeneration prevention unit and a switch OFF command to the cutoff switch such that the cutoff switch is turned OFF after the regeneration prevention unit prevents occurrence of the power regeneration; and
   a safety state determination unit that determines whether the power regeneration occurs when the failure determination unit determines that a failure occurs, wherein
   the abnormality control unit is configured to output, when the safety state determination unit determines that the power regeneration occurs, the regeneration prevention command to the regeneration prevention unit and the switch OFF command to the cutoff switch, and to output, when the safety state determination unit determines that no power regeneration occurs, the switch ON command to the cutoff switch.

6. The control circuit for the power converter according to claim 1, wherein the control circuit is provided with a processing unit for causing the abnormality control unit to simulate a process executed when a failure is detected in the control system, and a checking unit for determining, with the simulation by the abnormality control unit, whether the cutoff switch is capable of being turned OFF after preventing the power regeneration from occurring by the abnormality control unit.

7. The control circuit for the power converter according to claim 6, wherein the control circuit is provided with a discharge processing unit that executes a discharge processing of the storage unit after the switch OFF command is outputted to the cutoff switch; and the checking unit is configured to determine, based on a decrease in a voltage of the storage unit caused by the discharge processing, that the cutoff switch is turned OFF due to the switch OFF command.

8. The control circuit for the power converter according to claim 7, wherein the discharge processing unit executes the discharge processing when the system is commanded to be stopped; and the checking unit is configured to determine, based on a decrease in a voltage of the storage unit caused by the discharge processing when the system is commanded to be stopped, that the cutoff switch is turned OFF due to the switch OFF command.

9. The control circuit of the power converter according to claim 1, wherein the system is provided with a series-connected body composed of a discharge resistor and a discharge switch which are connected in parallel to the storage unit; and the abnormality control unit is configured to turn the discharge switch to be ON when the failure determination unit determines that a failure occurs.

* * * * *